(12) United States Patent
Shore et al.

(10) Patent No.: US 11,393,180 B2
(45) Date of Patent: Jul. 19, 2022

(54) APPLYING NON-DESTRUCTIVE EDITS TO NESTED INSTANCES FOR EFFICIENT RENDERING

(71) Applicant: Weta Digital Limited, Wellington (NZ)

(72) Inventors: Nicholas S. Shore, Wellington (NZ); Oliver M. Castle, Wellington (NZ)

(73) Assignee: Unity Technologies SF, San Francisco, CA (US)

( * ) Notice: Subject to any disclaimer, the term of this patent is extended or adjusted under 35 U.S.C. 154(b) by 0 days.

(21) Appl. No.: 17/077,998

(22) Filed: Oct. 22, 2020

(65) Prior Publication Data
US 2021/0241540 A1     Aug. 5, 2021

Related U.S. Application Data

(60) Provisional application No. 62/968,951, filed on Jan. 31, 2020.

(51) Int. Cl.
*G06T 19/20* (2011.01)
*G06F 16/51* (2019.01)
(Continued)

(52) U.S. Cl.
CPC .............. *G06T 19/20* (2013.01); *G06F 16/51* (2019.01); *G06F 16/54* (2019.01); *G06F 3/0482* (2013.01); *G06F 3/04845* (2013.01); *G06F 16/587* (2019.01); *G06F 16/907* (2019.01); *G06F 2203/04803* (2013.01); *G06T 2200/24* (2013.01); *G06T 2210/61* (2013.01); *G06T 2219/2004* (2013.01)

(58) Field of Classification Search
None
See application file for complete search history.

(56) References Cited

U.S. PATENT DOCUMENTS 8,253,728 B1   8/2012   Sullivan et al.
9,208,597 B2   12/2015  Wilson et al.
(Continued)

FOREIGN PATENT DOCUMENTS

EP        3246921 A2    11/2017

OTHER PUBLICATIONS

International Search Report issued in PCT Application No. PCT/NZ2020/050135, dated Jan. 29, 2021.

*Primary Examiner* — YuJang Tswei
(74) *Attorney, Agent, or Firm* — Philip H. Albert; Haynes and Boone LLP

(57) ABSTRACT

A request is received to replicate an object in a scene description. A first data structure associating the object with object instances is generated to produce the object instances in the scene description, with each instance corresponding to a position that an instance of the object is to appear in the scene. The first data structure includes a first set of characteristics of the object instances that includes the position. A selection of an object instance and an instruction to customize a characteristic of the object instance is received. A customized characteristic of the object instance is produced by generation of a second data structure associating the customized characteristic with the first data structure. The object instances are rendered such that the customized characteristic of the second data structure supersedes the characteristic of the object in the first data structure.

14 Claims, 21 Drawing Sheets

(51) Int. Cl.
*G06F 16/54* (2019.01)
*G06F 3/0482* (2013.01)
*G06F 16/587* (2019.01)
*G06F 16/907* (2019.01)
*G06F 3/04845* (2022.01)

(56) References Cited

U.S. PATENT DOCUMENTS

| | | | |
|---|---|---|---|
| 10,373,342 B1 | 8/2019 | Perez, III et al. | |
| 2008/0098031 A1* | 4/2008 | Ducharme | G06F 3/0481 |
| 2013/0215148 A1* | 8/2013 | Antonyuk | G06F 3/017 |
| | | | 345/633 |
| 2013/0346911 A1* | 12/2013 | Sripada | G06T 19/003 |
| | | | 715/782 |
| 2016/0370982 A1* | 12/2016 | Penha | G06F 3/04883 |
| 2017/0228130 A1* | 8/2017 | Palmaro | G06F 3/0485 |
| 2018/0046339 A1* | 2/2018 | Naidoo | G06F 3/0484 |
| 2018/0144556 A1* | 5/2018 | Champion | G06F 3/0346 |

* cited by examiner

APPLYING NON-DESTRUCTIVE EDITS TO NESTED INSTANCES FOR EFFICIENT RENDERING

CROSS REFERENCE TO RELATED APPLICATIONS

This application claims the priority benefit of U.S. Provisional Patent Application No. 62/968,951, filed Jan. 31, 2020, hereby incorporated by reference in its entirety as though fully set forth herein.

FIELD OF THE INVENTION

The present disclosure generally relates to computer system that manage digital assets used to construct digital animation sequences and related user interfaces. The disclosure relates more particularly to apparatus and techniques for managing nested instances of objects.

BACKGROUND

As digital animation in film and other media becomes more and more prevalent, so too is the complexity of the digital effects increasing. When simulating a large number of similar-looking physical objects, instancing is often used to make copies of the same object throughout the scene. In order to make the scene believable, digital artists may want to customize some of the copies so that they are not all identical. However, making customizations can be a labor-intensive, manual process often requiring require digital artists to de-instance nested instances in order to make their customizations, thereby destroying the nested instance structure. Furthermore, instance data containing customizations is often not consolidated, which results in an inefficient, lengthy rendering process and unnecessary duplication of data. Moreover, if the layout of the scene is subsequently changed, customizations may either get overwritten or the changes may not be applied to the customized instances even if the changes would not have affected the customizations. Improved methods and apparatus for handling digital effects creation using instances might be desired.

SUMMARY

The software broker disclosed herein has particular, but not exclusive, utility for rendering computer-generated images that include contributions made by different people or groups, or at different times, or from different locations.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a computer-implemented method, comprising: under the control of one or more computer systems configured with executable instructions: (a) receiving a request to replicate a digital object in a scene description of a scene to be represented by one or more computer-generated images; (b) generating, to produce a plurality of object instances in the scene description, a first data structure associating the digital object with the plurality of object instances, each instance of the plurality of object instances corresponding to a placement that an instance of the digital object is to appear in the scene, the first data structure including a first set of characteristics of the plurality of object instances that includes the placement; (c) receiving a first selection of a first selected object instance of the plurality of object instances; (d) receiving a first instruction to customize a first characteristic of the first selected object instance; (e) producing a first customized characteristic of the first selected object instance by generating a second data structure associating the first customized characteristic with the first data structure; and (f) rendering the plurality of object instances such that the first customized characteristic of the second data structure supersedes the characteristic of the digital object in the first data structure.

Implementations may include one or more of the following features. In some embodiments, the method further comprises: (g) receiving a second selection of a second selected object instance of the plurality of object instances; (h) receiving a second instruction to customize a second characteristic of the second selected object instance; (i) producing a second customized characteristic of the second selected object instance by generating a third data structure associating the second customized characteristic with the first data structure; and (j) rendering the plurality of object instances such that the second customized characteristic of the third data structure supersedes the characteristic of the digital object in the first data structure. In some embodiments, the method further comprises, if the first customized characteristic and the second customized characteristic comprise the same customized characteristic, combining the second data structure and the third data structure.

Implementations may include a computer readable medium carrying executable instructions that, as a result of execution by one or more processors of a computer system, cause the computer system to carry out the method. In some embodiments, the method further comprises storing information about each object instance of the plurality of object instances, wherein the information includes at least one of a size, a color, a pose, a position, an orientation, a scale, a skew, a texture, a shading, a direction of motion, a rate of motion, a motion blur, a reflectiveness, a transparency, an animation, a note, a source object, or whether the object instance has been customized. In some embodiments, the method further comprises: receiving a second instruction to modify the first characteristic of the digital object; modifying the first characteristic of the digital object according to the second instruction; and modifying the first characteristic of the digital object and of the plurality of object instances without modifying the first customized characteristic of the first selected object instance.

Implementations may include a user interface configured to perform the receiving and rendering steps of the method. In some embodiments, the user interface may include an outliner panel configured to display the name of the object in the scene; an editor configured to receive selections from a user; a viewport; and a layout disposed within the viewport, wherein the layout is configured to display representations of the plurality of object instances.

In some embodiments, the layout is further configured to display a rendering of the plurality of object instances. In some embodiments, the outliner panel is configured to display the names of a plurality of objects and object instances. In some embodiments, the names of the plurality of objects and object instances are displayed as a hierarchy. In some embodiments, the hierarchy includes a set of nested object instances. In some embodiments, an object instance of the set of nested object instances can be customized independently from other object instances in the set of nested object instances. In some embodiments, a customization of an object instance of the plurality of object instances can be deleted at any level of the hierarchy without affecting other instances. In some embodiments, a customization of an object instance of the plurality of object instances can be deleted without affecting other customizations of the object instance. In some embodiments, a customization of a first object instance of the plurality of object instances may be copied to a second object instance of the plurality of object instances.

One general aspect includes a system, comprising at least one computing device configured to implement one or more services, wherein the one or more services are configured to: (a) receive a request to replicate a digital object in a scene description of a scene to be represented by one or more computer-generated images; (b) generate, to produce a plurality of object instances in the scene description, a first data structure associating the digital object with the plurality of object instances, each instance of the plurality of object instances corresponding to a position that an instance of the digital object is to appear in the scene, the first data structure including a first set of characteristics of the plurality of object instances that includes the position; (c) receive a selection of a selected object instance of the plurality of object instances; (d) receive an instruction to customize a characteristic of the selected object instance; (e) produce a customized characteristic of the selected object instance by generating a second data structure associating the customized characteristic with the first data structure; and (f) render the plurality of object instances such that the customized characteristic of the second data structure supersedes the characteristic of the digital object in the first data structure.

Implementations may include a non-transitory computer-readable storage medium having stored thereon executable instructions that, as a result of execution by one or more processors of a computer system, cause the at least one computing device to at least: (a) receive a request to replicate a digital object in a scene description of a scene to be represented by one or more computer-generated images; (b) generate, to produce a plurality of object instances in the scene description, a first data structure associating the digital object with the plurality of object instances, each instance of the plurality of object instances corresponding to a position that an instance of the digital object is to appear in the scene, the first data structure including a first set of characteristics of the plurality of object instances that includes the position; (c) receive a selection of a selected object instance of the plurality of object instances; (d) receive an instruction to customize a characteristic of the selected object instance; (e) produce a customized characteristic of the selected object instance by generating a second data structure associating the customized characteristic with the first data structure; and (f) render the plurality of object instances such that the customized characteristic of the second data structure supersedes the characteristic of the digital object in the first data structure.

Implementations of the described techniques may include hardware, a method or process, or computer software on a computer-accessible medium.

BRIEF DESCRIPTION OF THE DRAWINGS

Various embodiments in accordance with the present disclosure will be described with reference to the drawings, in which.

DETAILED DESCRIPTION

Figure 1:
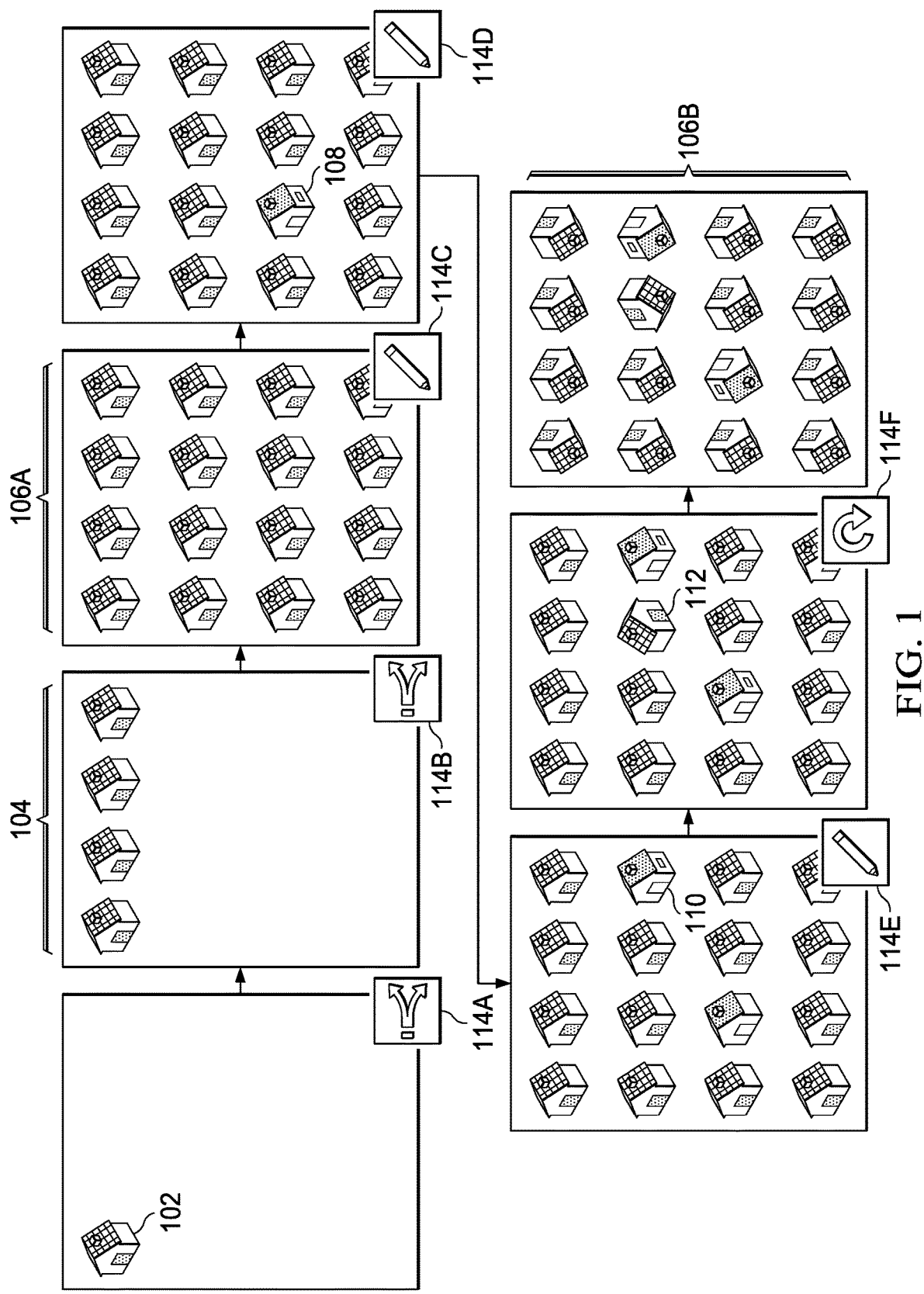
FIG. 1 shows an example of individual independent customizations in an instance session in accordance with an embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques and systems described below relate to customizing instanced digital objects. In digital imagery creation, such as digital animation, an artist or other operator might wish to construct a scene description that could be used to render imagery. For example, the operator might construct a scene description that describes a view of a three-dimensional (3D) space into which multiple instances of a "tree" object are placed at specified locations in the 3D space, along with multiple instances of a "rock" object and one or more character objects, along with other objects. A typical scene description might involve a large number of instances of objects. An overhead view of a scene of a city might require descriptions of many buildings, vehicles, roads, etc., and it could be quite tedious to have to individually describe each item in the scene. It can be less tedious if multiple identical instances of a given object are used, in which case perhaps all the input that is needed is a placement, but then all those instances might look identical and lead to an unrealistic scene. In some embodiments, a placement may for example be a matrix (e.g., a 4×4 matrix) that includes such information about an object instance as its position, orientation, scale, and skew. In some embodiments, scale or skew can be applied non-uniformly on different axes in order to change the shape of an object. An animation artist might want the simplicity of having instances of objects, but also an ability to customize instances by changing placement values or other properties, while still having those customized instances logically connected to their origin objects so that changes to the origin objects propagate as expected or desired.

In one example, a scene construction computer system receives a request to replicate a digital object in a scene. In the example, a first data structure associating the digital object with a plurality of object instances is generated to produce the plurality of object instances in the scene, with each instance of the plurality of object instances corresponding to a position that an instance of the digital object is to appear in the scene. In the example, the first data structure includes a first set of characteristics of the plurality of object instances that includes the position.

Further to the example, a selection of an object instance of the plurality of object instances is received. Still in the example, an instruction to customize a characteristic of the object instance is received. Then, in the example, a customized characteristic of the object instance is produced by generation of a second data structure associating the customized characteristic with the first data structure. Finally, in the example, the plurality of object instances is rendered such that the customized characteristic of the second data structure supersedes the characteristic of the digital object in the first data structure.

In some examples, "object" refers to a mathematical representation of a two-dimensional or three-dimensional physical item or being. The representation might be stored as a mesh of vertices defining a tessellated manifold of a boundary for the object, and a texture for coloring that boundary. In some examples, a "mesh" refers to a collection of vertices, edges, and/or faces that defines the shape of a polyhedral object in computer graphics modeling. In some examples, a "sub-object" refers to a constituent part of the digital object that itself is a digital object. Digital objects and sub-objects may be nested in a hierarchy; for example, a handle object may be a sub-object of a door object, which itself may be a sub-object of a house object, which itself may be a sub-object of a neighborhood block object, which itself may be a sub-object of a city object, and so on.

In some examples, "geometry instancing" (or "instancing" for short) refers to the rendering of multiple copies of the same computer graphics mesh in a scene at once. In some examples, a "scene" refers to a virtual workspace for editing and/or rendering a three-dimensional project. In some examples, an "interface" refers to computer hardware or software designed to communicate information between hardware devices, between software programs, between devices and programs, or between a device and a user.

In some examples, an "instance" (also referred to as an "object instance") may refer to data that references the digital object (e.g., file location of the particular object mesh) and indicates a position at which to place a representation of a digital object within a scene and may also include other duplicated data (e.g., vertex data, etc.) of the digital object itself, but may have other attributes (e.g., scale, dimensions, color, position orientation, animation, pose, etc.) separate from or in addition to the object data. In some examples, "instantiate" refers to an electronic computing device creating an "instance" of a digital object (e.g., generating a set of data corresponding to the particular instance within the scene).

In some examples, a "layout" refers to a particular arrangement of one or more objects. The layout may be instanced as multiple copies in different locations within a scene. In some examples, a "customization" refers to a modification of a characteristic of an object instance to be different from the characteristic of a parent object from which the digital object was derived. In some examples, a "characteristic" of an object instance refers to an attribute or other feature specific to the object instance; for example, a characteristic can include, but not be limited to, a size, a dimension, a color, a texture, a scale, a skew, a shading, a direction of motion, rate of motion, rate of rotation, motion blur, reflectiveness, transparency, an animation sequence, a note, an object data source, and so on. Further, a customization may include adding or removing/deleting a digital object or sub-object from a layout or adding or removing an attribute from an object instance.

Techniques described and suggested in the present disclosure improve the field of computing, especially the field of digital animation, by providing a non-destructive (e.g., to the instance hierarchy) way to edit a portion of a complex instanced scene description that preserves the hierarchy of a set of object instances even when some of the instances of the set have been customized to be different from other instances of the set. Additionally, techniques described and suggested in the present disclosure improve the efficiency of digital animation systems by consolidating customizations between instances with matching customizations, thereby achieving a reduction in storage space, memory space, and rendering time for the set of object instances. Moreover, techniques described and suggested in the present disclosure are necessarily rooted in computer technology in order to overcome problems specifically arising with having to manage customized instances without having to re-create customizations if changes are made to the set of object instances, and do so by ensuring that the customized instances still inherit the attributes of the set of instances except where superseded by the particular customization.

FIG. 1 illustrates an example of individual independent customizations in accordance with an embodiment of the present disclosure. FIG. 1 depicts a scene, at various stages of input, with representations of many objects in the form of digital object instances, with many the digital object instances being the same or similar such that much of the content is repeated. Consequently, instancing may be used to reduce the complexity of the data and increase efficiency for processing (e.g., rendering) the scene by, for example, minimizing the duplication of repeated content (e.g., keeping a single copy of data related to characteristics of the house, but with multiple references to positions of each instance of the house). Specifically, FIG. 1 depicts multiple instances of a digital object (e.g., representing a house) with some instances having individual customizations and the progression of arrows indicates an evolution of the scene as user input is obtained. In some examples, user input is illustrated by icons in the lower right corner of each scene. It should be understood that the scene description might be represented by data in memory that logically corresponds to what is illustrated in FIG. 1.

Thus, in an embodiment, the layout 102 is a digital representation of a digital object (e.g., a house). The layout 102 may itself be made of sub-objects (e.g., doors, windows, roof, chimney, walls, etc.). The placement (e.g., position, orientation, scaling, or skew) or other properties (e.g., color, etc.) of the layout 102 may be stored in a data structure in memory or other storage.

In an embodiment, an operator might replicate the layout 102 in a second stage of creating the scene to instantiate a first set of object instances 104, perhaps using an input command corresponding to a replication command represented in FIG. 1 by an icon 114A. The replication may be performed in various ways, such as by selecting the layout 102, selecting a replication command from a user interface, and indicating different locations where instances of the layout 102 are to be placed within the scene. In an embodiment, the first set of object instances 104 is a group of instances of the layout 102 in the scene. Rather than copying the entirety of the data comprising the digital object, the copies may be linked to a master copy of the digital object (e.g., via data references or pointers) with separate data structures storing the position of each replicated object within the scene.

In FIG. 1, the operator further replicates, perhaps using an input command represented in FIG. 1 by icon 114B, the layout 102 to instantiate a second set of object instances 106A. It is contemplated that replicating the layout 102 to produce the second set of object instances 106A may be performed in various ways, such as by selecting the layout 102, selecting a replication command from the user interface, and placing copies of the layout 102 at different locations within the scene, or alternatively selecting the first set of object instances 104 as a whole and placing copies of the first set of object instances 104 at different locations within the scene.

The second set of object instances 106A may be in a first state whereby each of the instances of the second set of object instances 106 may be associated with an individual data set maintaining the location of the object instance within the scene and linked to a single master copy of a data set storing shared characteristics of the other instances of the same object.

Techniques of the present disclosure allow for customization of elements that may be nested within multiple levels of instances. For example, a scene may comprise a large city made up of multiple city block instances, and each city block instance may have a number of building instances, and each building instance may have a number of component parts. Customization, as described in the present disclosure, enables an attribute of one of those component parts to be modified without affecting the other instances in the hierarchy. In this manner, a scene data structure can be efficiently worked with, edited, reviewed, etc., notwithstanding the presence of many repeated structures and commonality between instances.

In FIG. 1, the operator further performs a first customization operation, perhaps using an input command represented in FIG. 1 by icon 114C, where the operation might be coloring the roof black, the door white, and adding a window, etc. The operation may be performed on one of the object instances of the second set of object instances 106A to produce a first customized object instance 108. The first customization operation may be performed in various ways, such as by selecting the roof portion of the digital object and selecting a different color palette or texture for the roof and/or door and inserting an opening in an outer wall. Thus, the first customized object instance 108, unlike the other object instances of the set of object instances 106A, is no longer an exact copy (but for position) of the layout 102.

In an embodiment, the first customized object instance 108 is an instance of the layout 102 but with a variation from the object instance other than position in the scene. In FIG. 1, the first customized object instance 108 can be seen to have a darker roof, lighter door, and a window different from the other objects of the second set of object instances. In embodiments, the first customization operation may cause the set of data of the digital object (e.g., the house) to be copied to a new set of data to represent the first customized object instance 108. In embodiments, the new set of data for the first customized object instance 108 may not include all characteristics of the original object but may include with additional or alternative characteristics to define the variations (e.g., roof color and window) from the original object. In this manner, characteristics of the first customized object instance 108 that are still shared with the original object (e.g., house orientation, wall color, door placement, chimney color and placement, etc.) may still be linked to the parent object and changes made to the parent object may propagate to the first customized object instance 108 except where overridden by the customized variations. In this manner, the hierarchy of the instancing may be preserved while still making it possible for a digital animation artist to add unique touches to areas of interest without affecting the other instances or the rest of the scene.

In FIG. 1, the operator further performs a second customization operation, perhaps using an input command represented in FIG. 1 by icon 114D, to another one of the object instances of the second set of object instance 106 to produce a second customized object instance 110. The second customization operation may be performed in a similar manner to the performance of the first customized operation. Thus, the second customized object instance 110, like the first customized object instance 108, may no longer be an exact copy of the layout 102.

Still in FIG. 1, the operator performs a third customization operation, perhaps using an input command represented in FIG. 1 by icon 114E (e.g., flipping the house horizontally), to yet another of the object instances of the second set of object instances 106A to produce a third customized object instance 112. Like the previous customization operations, the third customization operation may be performed in various ways, such as by selecting the representation of the digital object in an interface and choosing an appropriate command from an editing toolbar. Thus, the third customized object instance 112, like the first customized object instance 108 and the second customized object instance 110, may no longer be an exact copy of the layout 102.

In FIG. 1, the operator performs a rotation operation, perhaps using an input command represented in FIG. 1 by icon 114F, on all of the instances to produce a second set of object instances 106B at a second state. The rotation operation may be performed in various ways, such as, for example, selecting the second set of object instances as a whole and selecting via a user interface to rotate the selected objects 180 degrees. As can be seen in FIG. 1, each of the second set of object instances 106B in the second state are individually rotated by 180 degrees, but the first customized object instance 108, the second customized object instance 110, and the third customized object instance 112 retain their individual customizations. In this manner, techniques of the present disclosure make it easy for a digital animation artist to customize individual objects in a way that preserves the overall hierarchical nested structure of the geometric instancing, while still making it possible to uniquely control the areas that are of interest to the digital animation artist.

Note that although houses are depicted in FIG. 1 as illustrative objects, it is contemplated that any of various other digital objects may be manipulated in this manner. Furthermore, it is contemplated that the techniques described in the present disclosure may be applied to nested levels of instances and customizations. For example, a tree object may comprise a plurality of instanced branch objects and a plurality of instanced leaf objects. A digital animation artist may customize some of the branches to make several variations of leafy branches, and then make larger branches out of these branches and so on. Thus, there may be multiple levels of instances, customizations, and instanced customizations and if the tree needs to be moved to a different position, the original content of the customizations may be maintained automatically.

Figure 2:
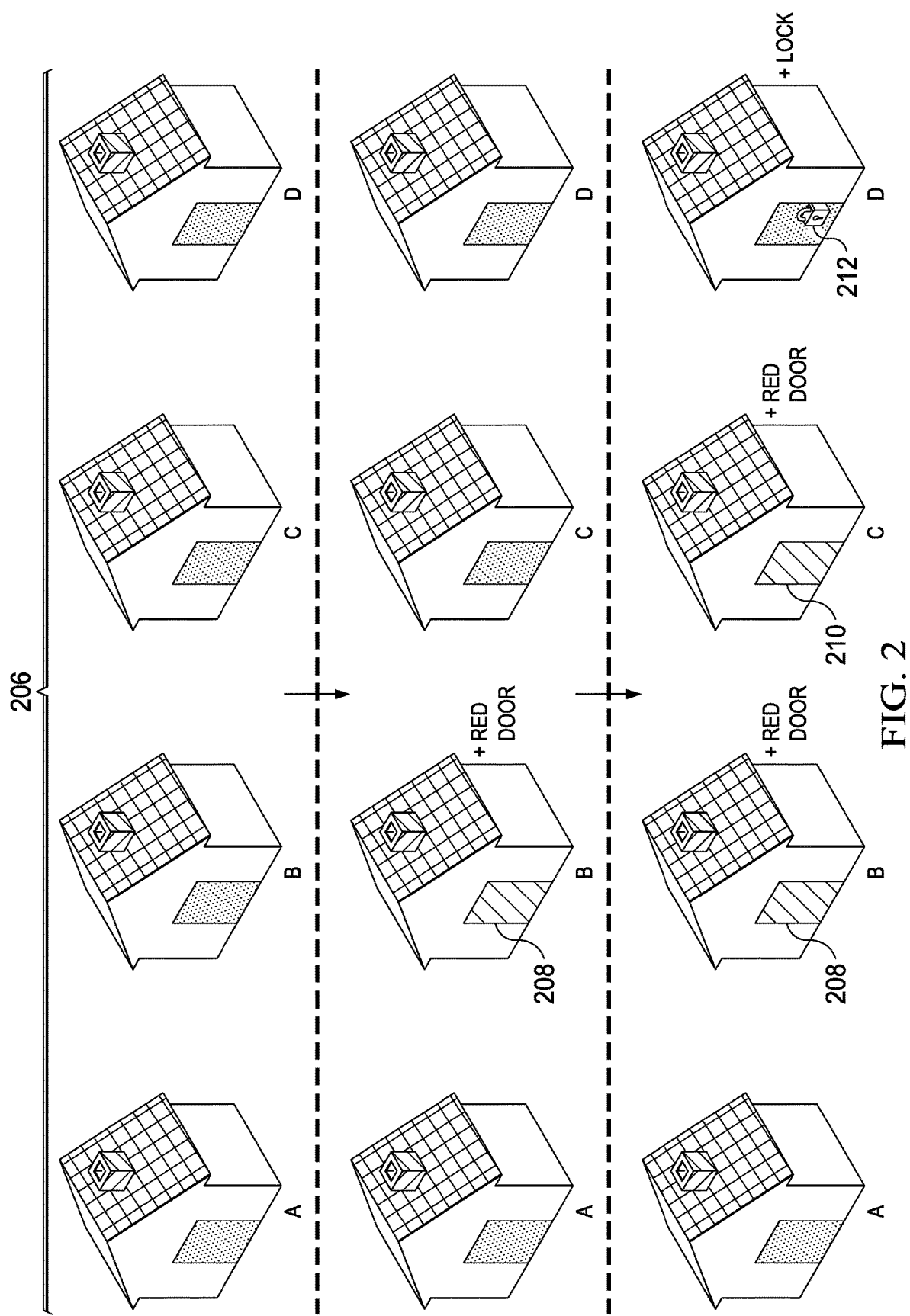
FIG. 2 shows an example of customizing and consolidating individual instances in accordance with an embodiment.

FIG. 2 illustrates an example of customization and consolidation in accordance with an embodiment of the present disclosure. Specifically, FIG. 2 depicts a scene comprising instances 206 of a house object in three different states of customization. In an initial state, instances A-D have identical attributes.

In embodiments of the present disclosure, an attribute of a digital object or object instance is associated with a name and a value. One or more attributes of the object instance may inherit values from the layout from which it was instanced. A customization, then, may be data that comprises an instruction to change a particular attribute state on a particular object instance to be a specified value.

In a second state of the scene, a door of instance B has had a first customization 208 applied to change the color attribute of the door to red instead of its default color. Instances A, C, and D, however, remain identical, and the first customization 208 may be stored in a separate data structure in association with/linked to instance B.

In a third state of the scene, two more customizations are seen to have been applied. Instance B still has the first customization 208, but instance C has had a second customization 210 that similarly changes the color attribute of its door to red. Instance D has had, as a third customization 212, a lock object affixed to its door. Instance A remains unchanged.

In some embodiments, the system of the present disclosure may detect that, although the first customization 208 and the second customization 210 were applied separately, that the customization effect (changing the color attribute to red) is the same. Consequently, rather than maintaining two separate data entries for each of the first customization 208 and the second customization 210, the system may consolidate the customization data. For example, the data entries for each of the instance B and the instance C may be modified to refer to the same customization (door color attribute set to red). In some embodiments, the system determines, for each instance of the instances 206—customized or not—whether the instance can be consolidated together with another instance.

Note that a scene may be stored in a hierarchical data structure comprised of a set of items, attributes, and connections. In various implementations, an interface may load some or all of the hierarchical data structure. For example, artist A may create a digital object, such as a representation of house and store it in the hierarchical data structure. Artist B may create a scene and place two instances of the house object created by artist A within the scene and store this data related to the scene in the hierarchical data structure as a reference to the digital object and the placement data of the instances of the digital object. Later, artist A may edit the house object, for example, by adding a window. When artist B subsequently opens the scene, the two instances of the house object may automatically include windows corresponding to the window added by artist A to the digital object. In this manner, separate artists' responsibilities may still be complementary.

On the other hand, customizations may be stored in the hierarchical data structure separate from, but associated with, the hierarchies of instances and the hierarchies of the objects referred to by the instances. Furthermore, a customization within a scene may take priority over changes to the reference data. To continue with the example, if artist B customizes one of the instances to have a door with a metallic texture, and then artist B modifies the reference object to have a door with a wood texture, only the un-customized instance of the house object will update to have a wood door since the customized metallic texture door of the other instance may take priority over (supersede) the updated reference data.

For example, if, in FIG. 2, the default door color is changed from black to blue, in a fourth state (not shown), the doors of instances A and D would become blue, but the doors of instances B and C would remain red due to the customized attribute taking priority over the updated reference data (default color updated from brown to blue). The third customization 212 of instance D would not override the change in the color of the door because the addition of a lock feature would not conflict with the color attribute of the door.

Figure 3:
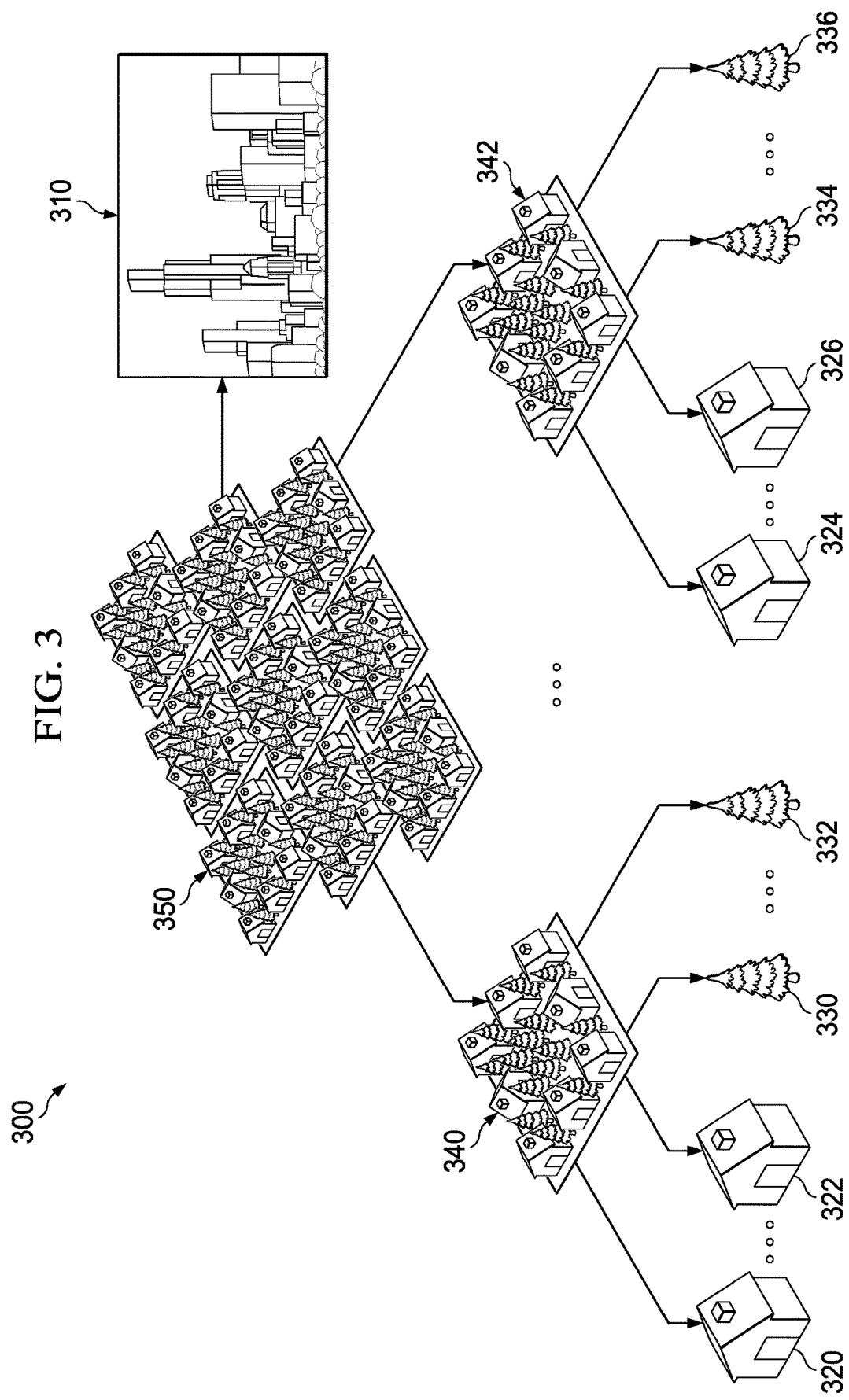
FIG. 3 illustrates an exemplary process or method for designing a scene of a cityscape by assembling multiple instances of houses and trees in accordance with an embodiment.

FIG. 3 illustrates an exemplary process or method 300 for designing a scene of a cityscape 310 by assembling multiple instances of houses 320, 322, 324, 326 and trees 330, 332, 334, 336, in accordance with an embodiment. The houses and trees can be assembled into city blocks 340 and 342. Multiple instances of city blocks 340 and 342 can then be assembled into a neighborhood 350. Multiple neighborhoods can be assembled into a city 310. In an example, an artist can edit one house (e.g., house 320, for example by changing its size or color, or by adding, moving, or deleting an element such as a window or door), and all instances of that house in the city block, neighborhood, and city (e.g., city block 340, neighborhood 350, and a city depicted by cityscape 310) will be changed accordingly. Alternatively, the artist may customize a particular instance of the house within a city block or neighborhood, and the edits will be saved only for that instance, and for hierarchical children of that instance. In some embodiments, an artist can edit the concept of a house (e.g., by changing the basic shape), and the edits will flow into all four objects depicted as houses 320, 322, 324, and 326.

Figure 4:
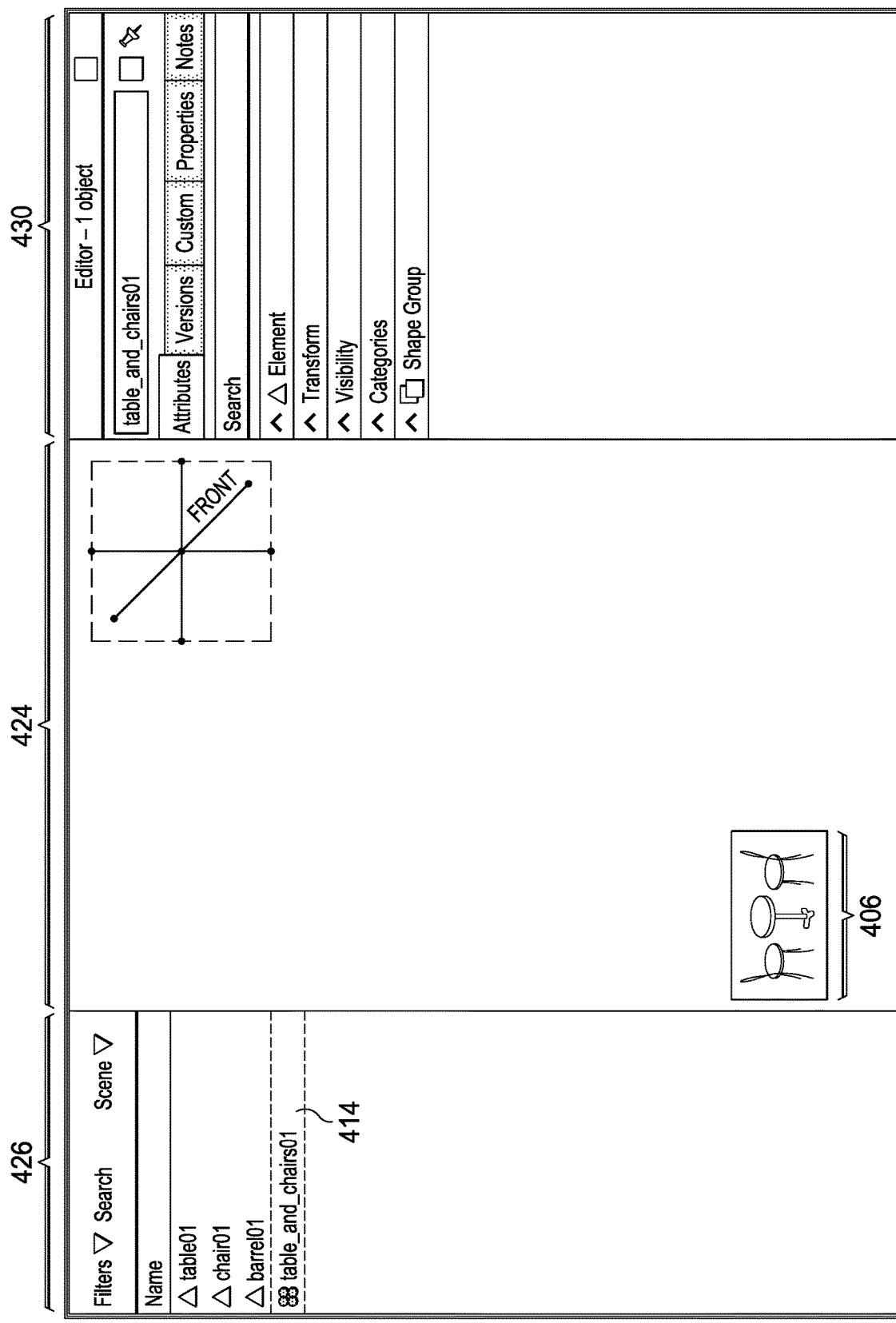
FIG. 4 shows an example of an interface for independently customizing instances in accordance with an embodiment.

FIG. 4 illustrates an aspect of an example interface 418, which might be a user interface, of an embodiment of the present disclosure. Specifically, FIG. 4 depicts an example interface 418 for instancing a scene and editing object instances in the scene. The example interface 418 illustrates a simple scene in the initial stages of being built. The example interface 418 may comprise a viewport 424 and an outliner panel 426, with the viewport depicting and an element 406 that might be a layout element or an instancing element. The outliner panel 426 may display the names of objects or object instances in the scene, or groupings thereof. The element 406 may be an entity comprising a set of elements. The element 406 of FIG. 4 is illustrated as a set of elements comprising two chair objects and one table object.

In an embodiment, the viewport 424 is a viewing area that may depict a view of the scene. In an example, the user or operator may make selections in the outliner panel 426 and/or in an editor panel 430 (e.g., with a keyboard, mouse, touchscreen, etc.). Depending on selections by the operator of the example interface 418, the viewport 424 may depict wireframe mesh representations of objects within the scene, while in other cases the viewport 424 may depict more substantial (e.g., rendered according to selected quality preferences) renderings of the digital objects within the scene.

In an embodiment, the outliner panel 426 is a panel of the example interface 418 that illustrates an outline of the hierarchy of objects depicted within the viewport 424. In the outliner panel 426, the highlighted 414 label "table and chairs01" may refer to the instance of the layout or instancing element 406 depicted in the viewport 424. The various levels of the hierarchy may be expanded or collapsed according to input by an operator of the example interface 418. In various implementations, a digital object may be selected from the outliner panel 426 and one or more attributes of the digital object may be viewed, changed, or deleted. Likewise, objects may be selected, copied/pasted, or deleted from the outliner panel 426.

Figure 5:
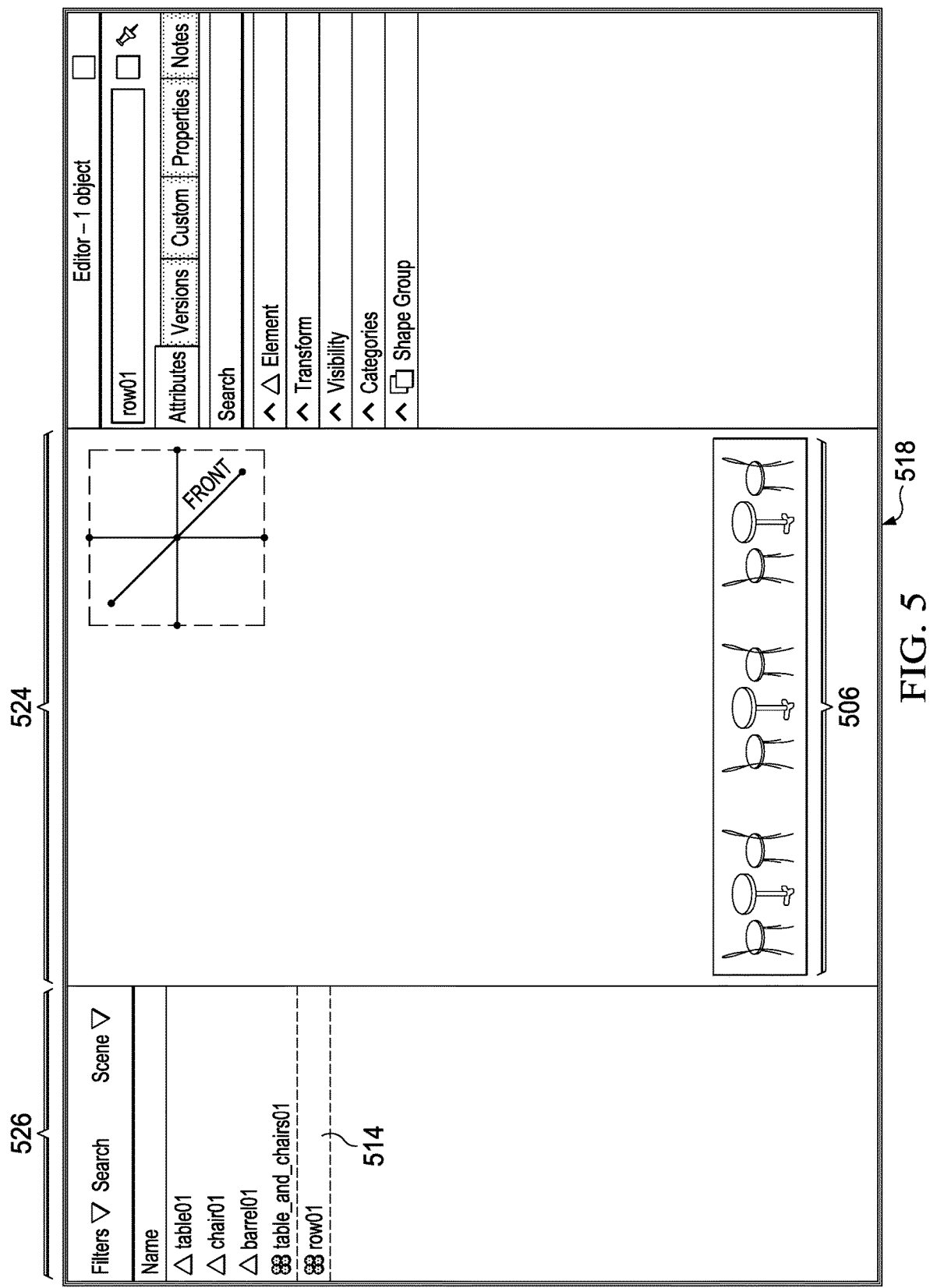
FIG. 5 shows another example of an interface for independently customizing instances in accordance with an embodiment.

FIG. 5 illustrates an aspect of an example interface 518 of an embodiment of the present disclosure. Specifically, FIG. 5 depicts an example interface 518 for instancing a scene and editing object instances in the scene. In FIG. 5, the instancing element or layout 406 from FIG. 4 has been instanced from the layout or instancing element 406 into a row of instances 506, itself being a nested instancing element made up of a set of three entities with each of the three entities comprising a set of elements (e.g., two chair objects and one table object) identical to the sets of elements of the other entities of the set. Thus, the example interface 518 depicts nested instancing of two levels of instancing (e.g., a first level being the row of instances 506 and a second level being multiple instances of the instancing element 406 nested within the row of instances 506). As shown in an outliner panel 526, which may be similar to the outliner panel 426 or 526, the highlighted 514 label "row01" may refer to the row of instances 506 now shown in a viewport 524.

Figure 6:
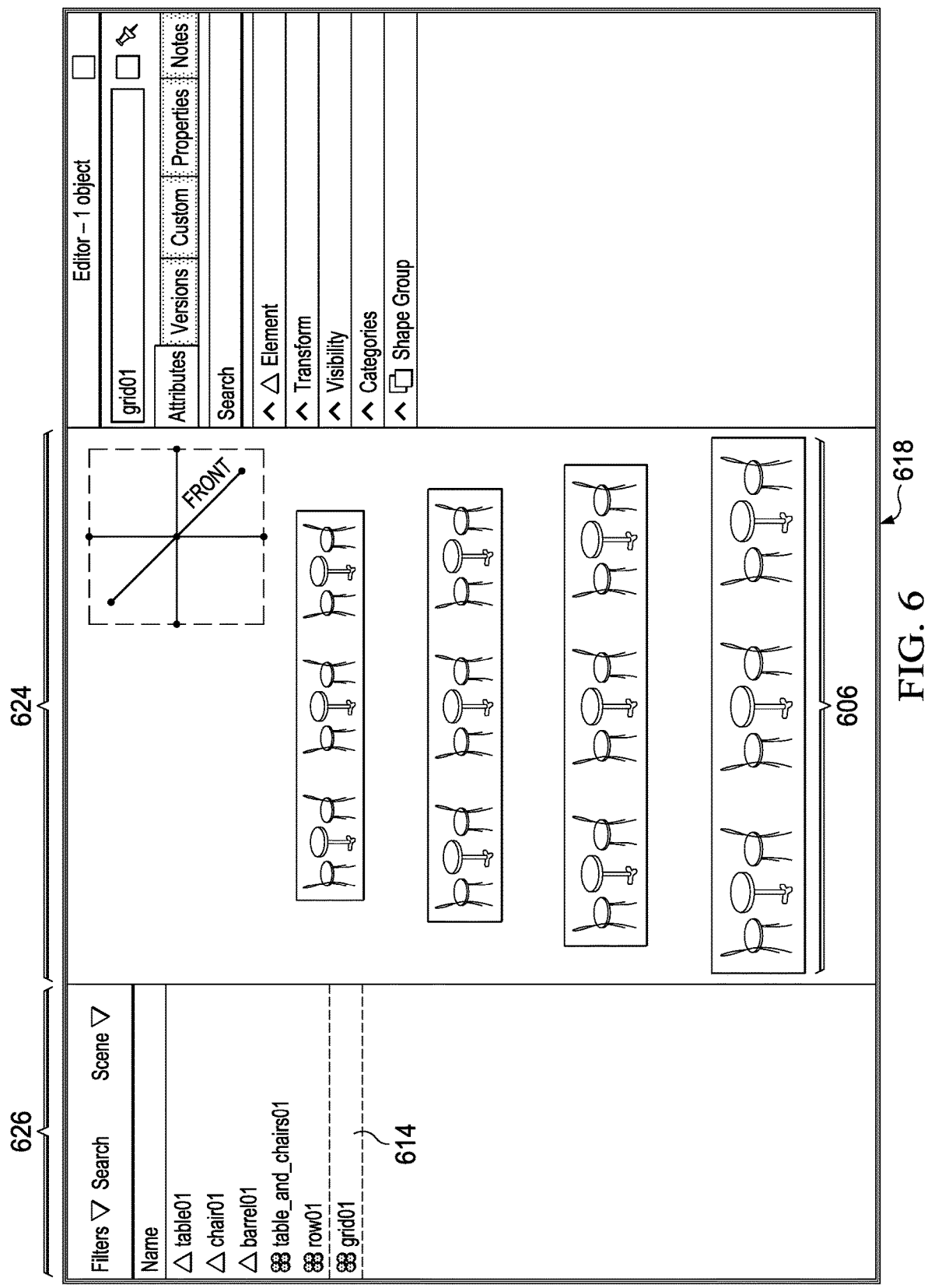
FIG. 6 shows another example of an interface for independently customizing instances in accordance with an embodiment.

FIG. 6 illustrates an aspect of an example interface 618 of an embodiment of the present disclosure. Specifically, FIG. 6 depicts an example interface 618 for instancing a scene and editing object instances in the scene. In FIG. 6, the row of instances 506 of FIG. 5 has itself been instanced four times into a set of nested instances 606 in viewport 624. As seen in an outliner panel 626, which may be similar to the outliner panel 426, the set of nested instances 606 is a double nested instancing element (made up of nested instances of the row of instances 506, which itself is made up of nested instances of the element 406) represented as "row01" highlighted 614 in outline 626. Thus, in some examples, multiple nested instances may be displayed, including two or more levels of instancing and/or two or more levels of nesting.

Figure 7:
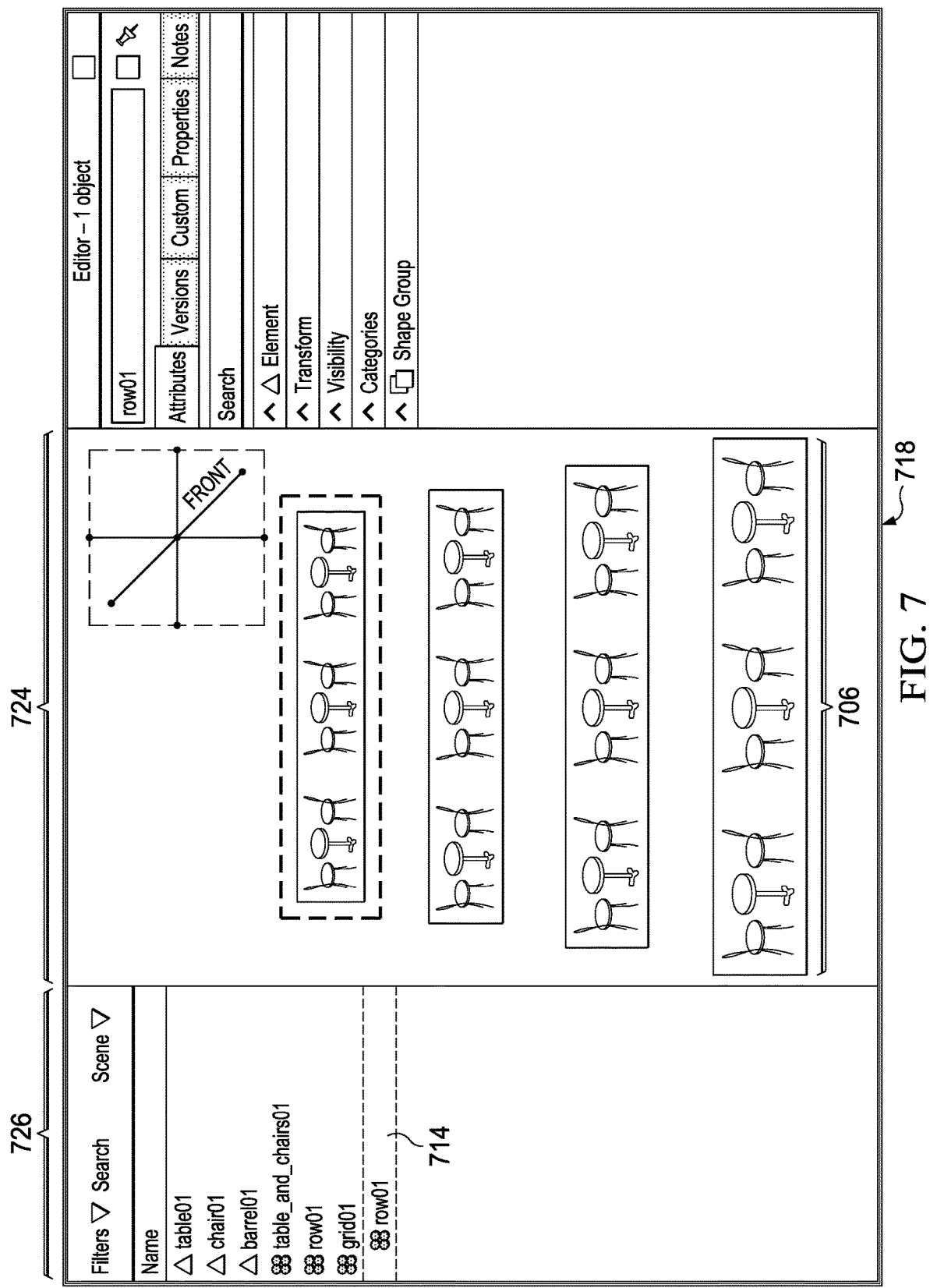
FIG. 7 shows another example of an interface for independently customizing instances in accordance with an embodiment.

FIG. 7 illustrates an aspect of an example interface 718 of an embodiment of the present disclosure. Specifically, FIG. 7 depicts an example interface 718 for instancing a scene and editing object instances in the scene. In FIG. 7, one of the rows of a set of nested instances 706 (e.g., the set of nested instances 606 of FIG. 6), has been selected in viewport 724, causing the layout of the selected row to be loaded (as shown by the "row01" highlighted 714 under "grid01" in an outliner panel 726 of the example interface 718).

Figure 8:
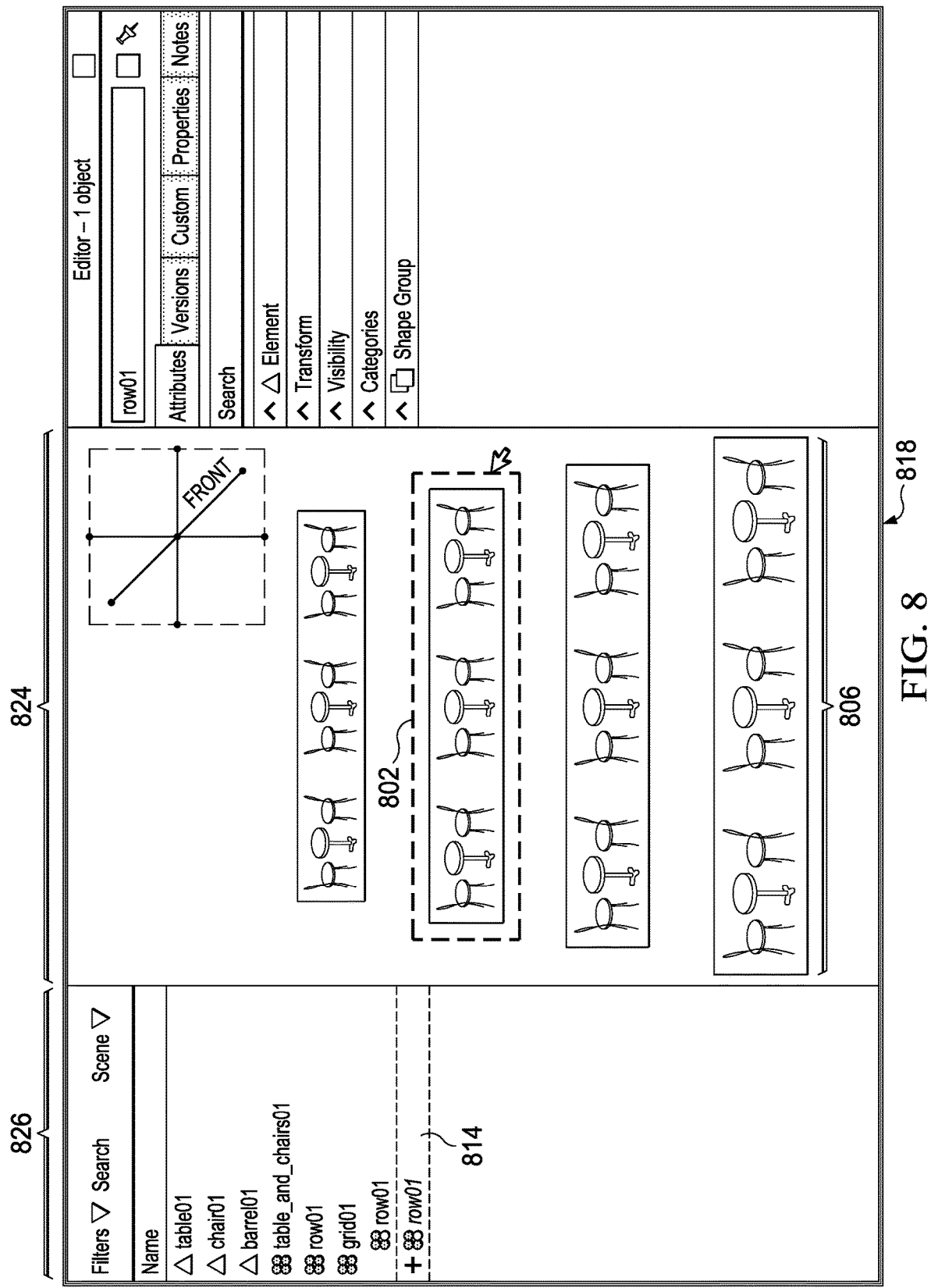
FIG. 8 shows another example of an interface for independently customizing instances in accordance with an embodiment.

FIG. 8 illustrates an aspect of an example interface 818 of an embodiment of the present disclosure. Specifically, FIG. 8 depicts an example interface 818 for instancing a scene and editing object instances in the scene. FIG. 8 illustrates how a sub-instance of a set of nested instances can be customized independently from other instances in the set of nested instances. In FIG. 8, an instanced row 802 has been selected and moved in viewport 824, causing the layout of the selected instanced row 802 to be customized (as indicated by the "row01+" being italicized or highlighted 814 in an outliner panel 826 of the example interface 818). Thus, FIG. 8 depicts a sub-instance selected within rows 806 of nested instances.

Figure 9:
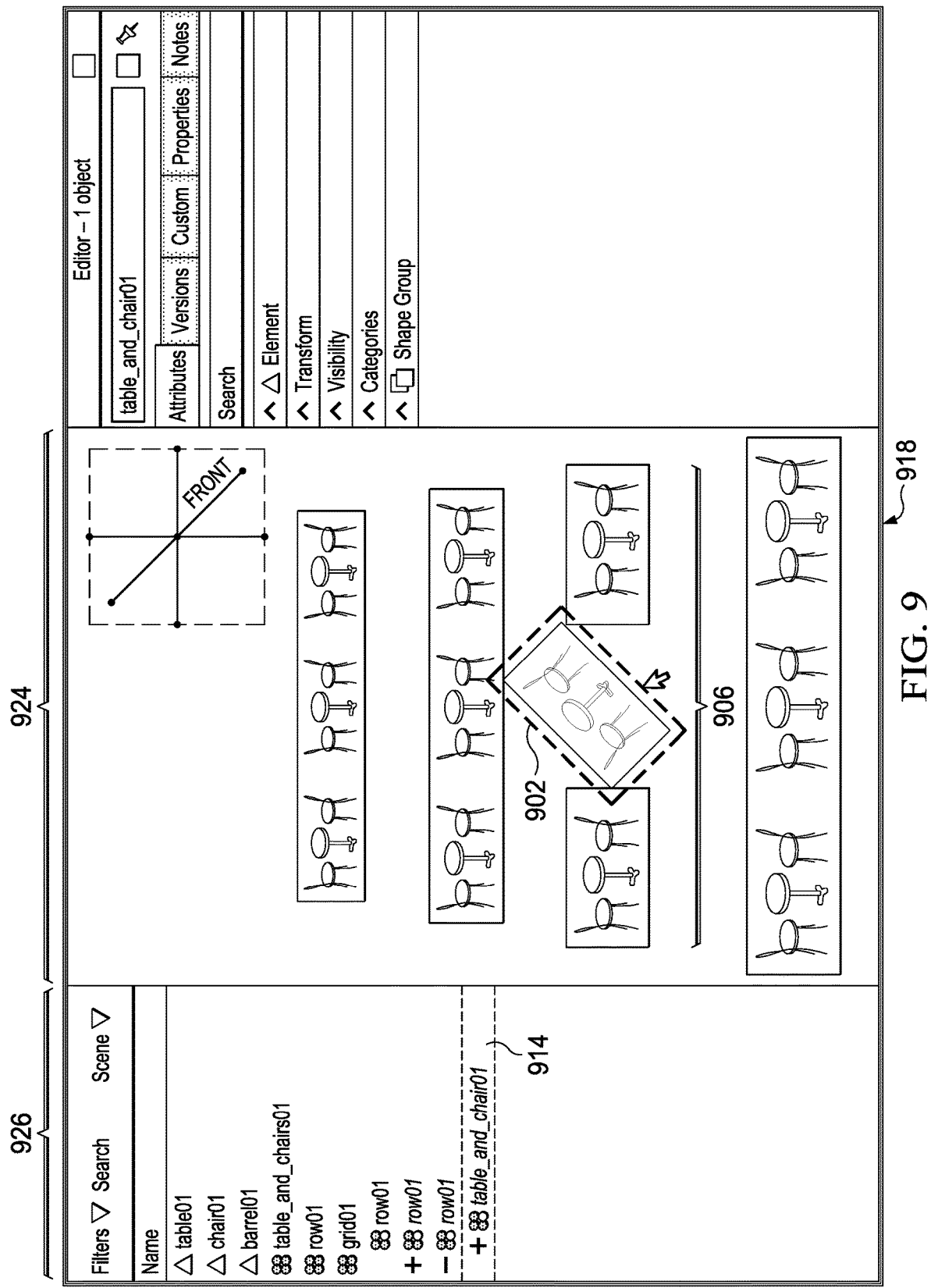
FIG. 9 shows another example of an interface for independently customizing instances in accordance with an embodiment.

FIG. 9 illustrates an aspect of an example interface 918 of an embodiment of the present disclosure. Specifically, FIG. 9 depicts an example interface 918 for instancing a scene and editing object instances in the scene. FIG. 9 illustrates how a sub-instance of a set of nested instances can be customized independently from other instances in the set of nested instances. In FIG. 9, the selected instance 902 in viewport 924 is a nested instance within an instanced row 906, which itself was instanced from the row of instances 506 of FIG. 5. In FIG. 9, the selected instance 902 has been customized by rotating the set of objects in the selected instance 902. As can be seen by highlighted 914 ("table_and_chair01") in the outliner panel 926, the layout of the selected instance 902 has been loaded and customized, and is depicted hierarchically beneath its respective row.

Figure 10:
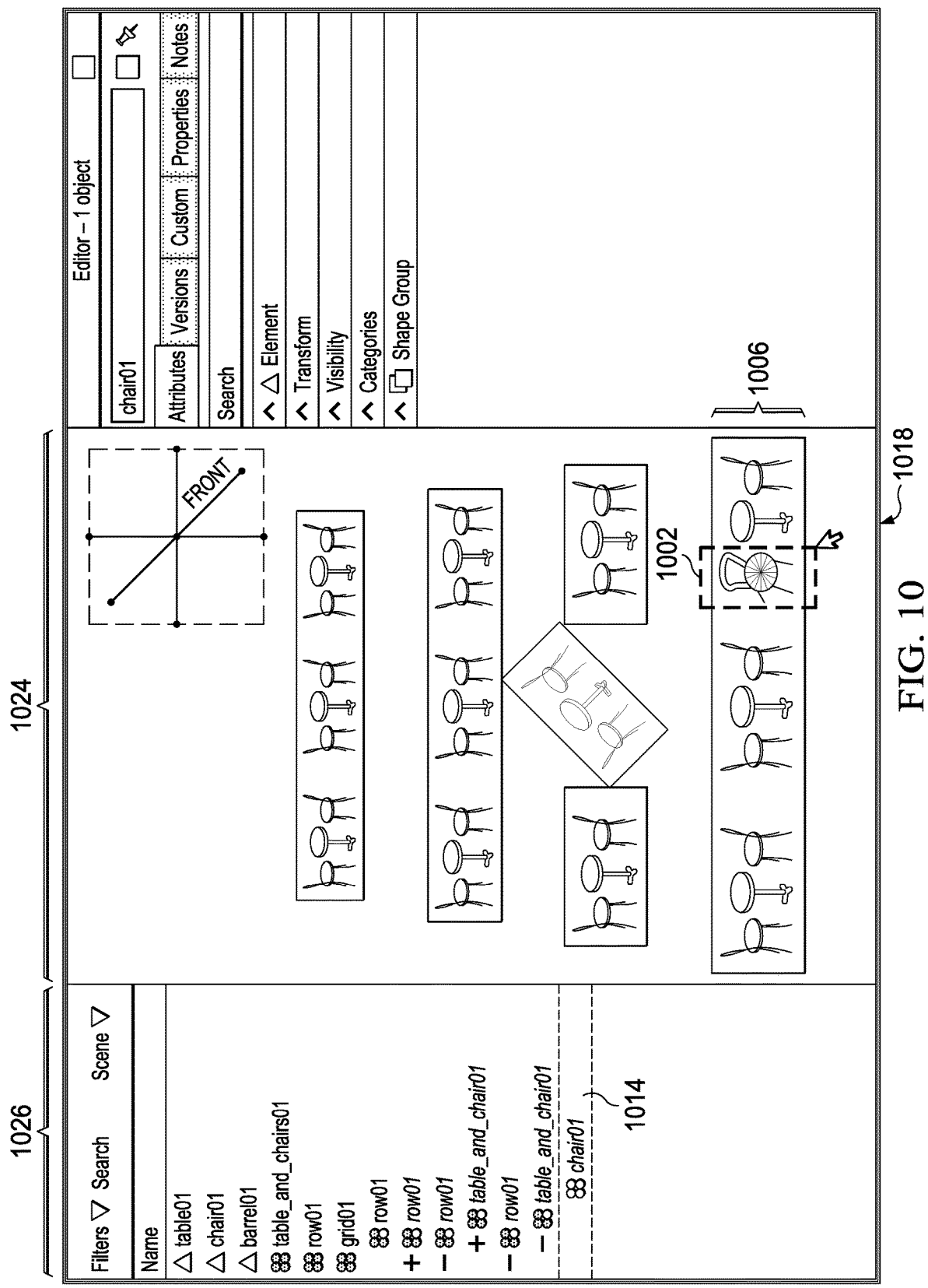
FIG. 10 shows another example of an interface for independently customizing instances in accordance with an embodiment.

FIG. 10 illustrates an aspect of an example interface 1018 of an embodiment of the present disclosure. Specifically, FIG. 10 depicts an example interface 1018 for instancing a scene and editing object instances in the scene. FIG. 10 illustrates how nested instance customizations can be made all the way to the element level in a set of nested instances. As seen in FIG. 4, the instancing element or layout 406 itself can be seen to contain three instances or sub elements (e.g., two instances of a chair object and one instance of a table object). Example interface 1018 shows a selected nested instance 1002 (one of the chair objects) in an instanced row 1006 having been selected and customized by rotating the nested instance 1002 by 90 degrees in viewport 1024. The selection and change can be seen depicted by the highlighted instance 1014 ("chair01") in the outliner panel 1026 of the example interface 1018. In this manner, customizations can be made to an instance while maintaining the instance's relationship with its parent instance or object, as can be seen in the hierarchy of alterations as shown in the outliner panel 1026. Customizations then may be a nondestructive set of edits on an arbitrary nested instance in the structure of the scene.

Figure 11:
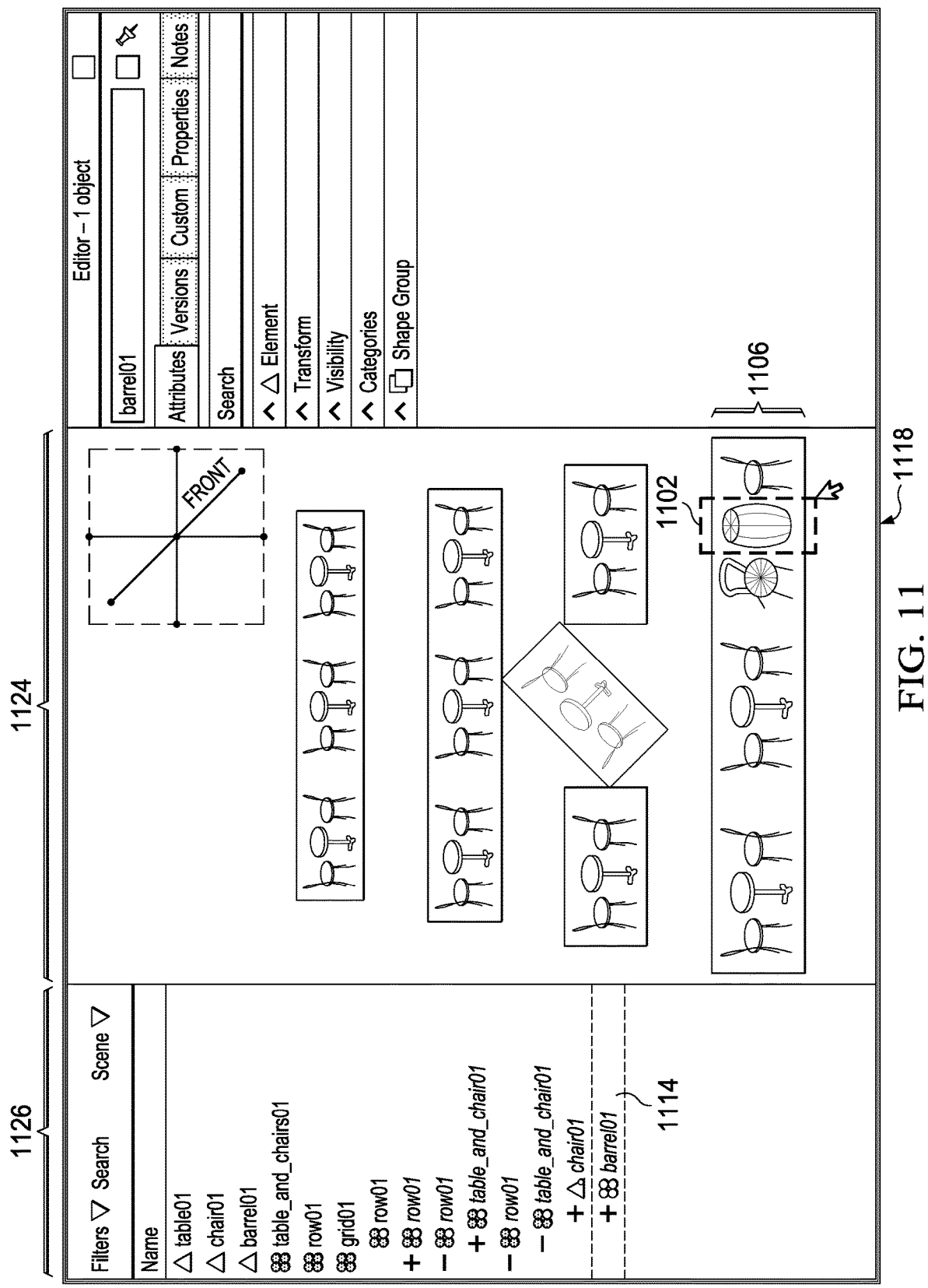
FIG. 11 shows another example of an interface for independently customizing instances in accordance with an embodiment.

FIG. 11 illustrates an aspect of an example interface 1118 of an embodiment of the present disclosure. Specifically, FIG. 11 depicts an example interface 1118 for instancing a scene and editing object instances in the scene. FIG. 11 illustrates how other types of customizations can be made to instances, beyond positional edits. For example, FIG. 11 depicts an instance 1102 that has had a customization made to change its source object from a table object to a barrel object in viewport 1124. As can be seen from the highlighted instance 1114 ("barrel01") in the outliner panel 1126, the barrel object has been customized and is shown hierarchically under "table_and_chair01" of an instanced row 1106.

Figure 12:
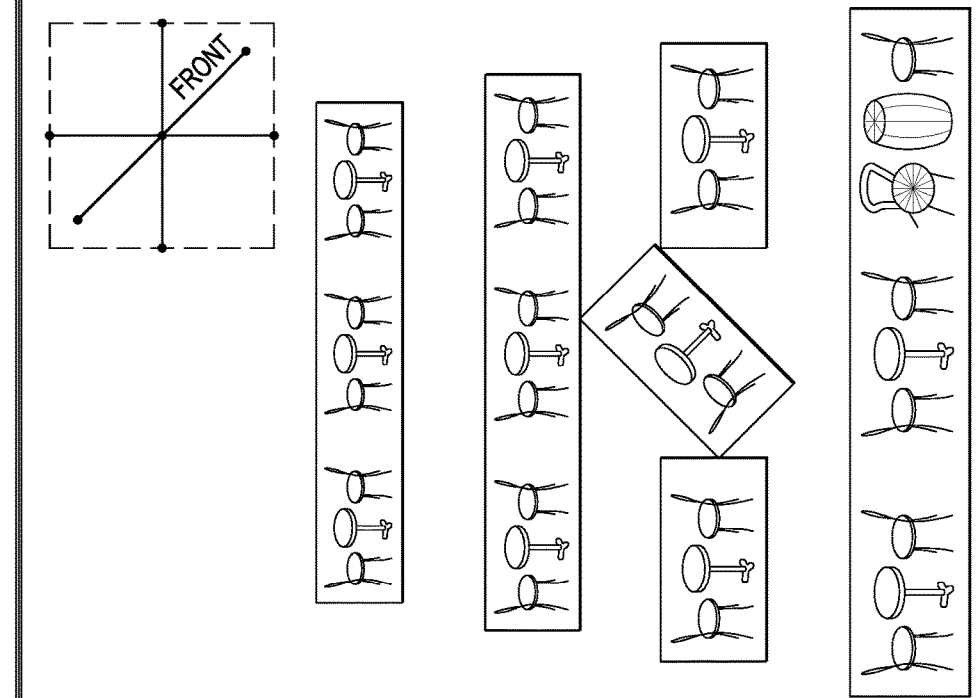
FIG. 12 shows another example of an interface for independently customizing instances in accordance with an embodiment.

FIG. 12 illustrates an aspect of an example interface 1218 of an embodiment of the present disclosure. Specifically, FIG. 12 depicts an example interface 1218 for instancing a scene and editing object instances in the scene. FIG. 12 illustrates the hierarchy of the customizations of the scene depicted. As can be seen, each of the customizations of FIGS. 8-11 are reflected by the customizations 1214A-1214D appearing beneath their respective instance in an outliner panel 1226. In this manner, the hierarchy of nested instances and the customizations 1214A-1214D are apparent at a glance. Likewise, the relationship between the customizations 1214A-1214D can be seen to be separately attached to their respective instances.

Maintaining the customizations within a hierarchical structure further allows customizations to be reversed/undone at any level of the hierarchy without affecting other instances. By associating the customizations 1214A-1214D in this manner, individual customizations can be deleted/undone or changed in any order and without affecting any other instances or customizations beyond their own. This benefit can be seen in FIG. 13 described below.

Figure 13:
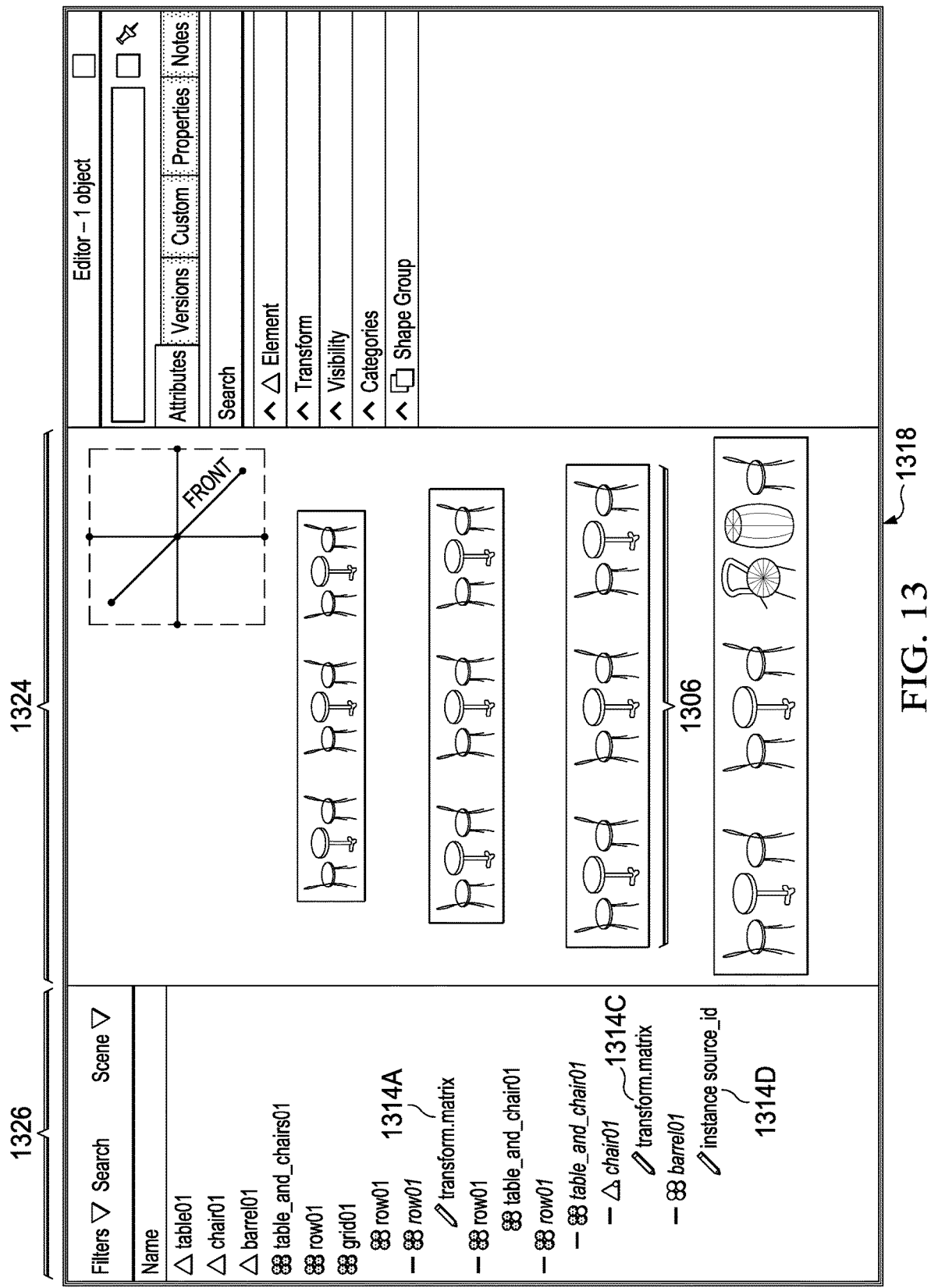
FIG. 13 shows another example of an interface for independently customizing instances in accordance with an embodiment.

FIG. 13 illustrates an aspect of an example interface 1318 of an embodiment of the present disclosure. Specifically, FIG. 13 depicts an example interface 1318 for instancing a scene and editing object instances in the scene. FIG. 13 illustrates how an individual customization can be undone without affecting other instances or customizations. FIG. 13 depicts the scene of FIG. 12 after customization 1214B has been deleted/undone; note that customization 1214B no longer appears in outliner panel 1326. As a result, the row 1306 in viewport 1324 now appears as it did in FIG. 8 prior to the customization applied to the selected instance 902 in the row in FIG. 9. The remaining customizations 1314A, 1314C, and 1314D are unaffected in FIG. 13, even though customizations 1214C and 1214D were made after the removed customization 1214B.

Furthermore, because customizations may be performed at the attribute level, non-conflicting customizations can be undone without affecting other customizations. In an illustrative example, an object instance is edited with a first edit that changes a color of the object instance from green to blue, then edited with a second edit that moves the object instance 25 pixels along the Y-axis, and then edited with a third edit that rotates the object instance by 30 degrees. In the example, the operator may undo the second edit (moving the object instance 25 pixels back to where it was), and the first and second edits remain (i.e., the object instance color is still blue and the object instance is still rotated by 30 degrees) because each of the three edits was to a different, non-conflicting attribute of the object instance.

In some implementations, customizations may be copied from one customized instance to another instance to make the other instance customized in the same way. In such a case, the other instance may be modified to have a reference to the same customization; in this manner, customizations may be maintained in an efficient, space-saving structure whereby a set of instances customized in the same manner can refer to the same single set of data for the customization that applies to all of the set of instances.

Figure 14A:
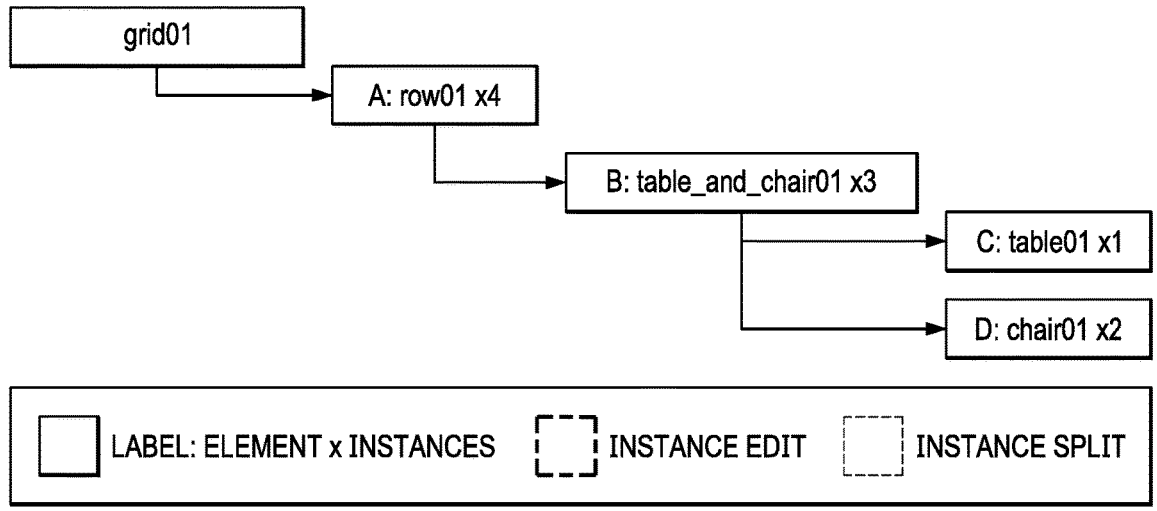
FIG. 14A shows an initial instancing state of a scene in accordance with an embodiment.

FIGS. 14A-14E illustrate internal instancing consolidation structure by showing the object-instance hierarchy before and after the customizations made and shown in FIGS. 6-11, respectively. As illustrated in FIG. 14A, the state of the scene in FIG. 6 is a grid ("grid01") comprising a set of four rows ("A:row01×4") of the nested instances 606, each row being associated with a set of three nested instances ("B:table and_chairs01×3"), and each nested instance comprising an object instance of a set of objects, with each object comprising sub-objects of a table object ("C:table01×1) and two chair objects ("D:chair01×2").

Figure 14B:
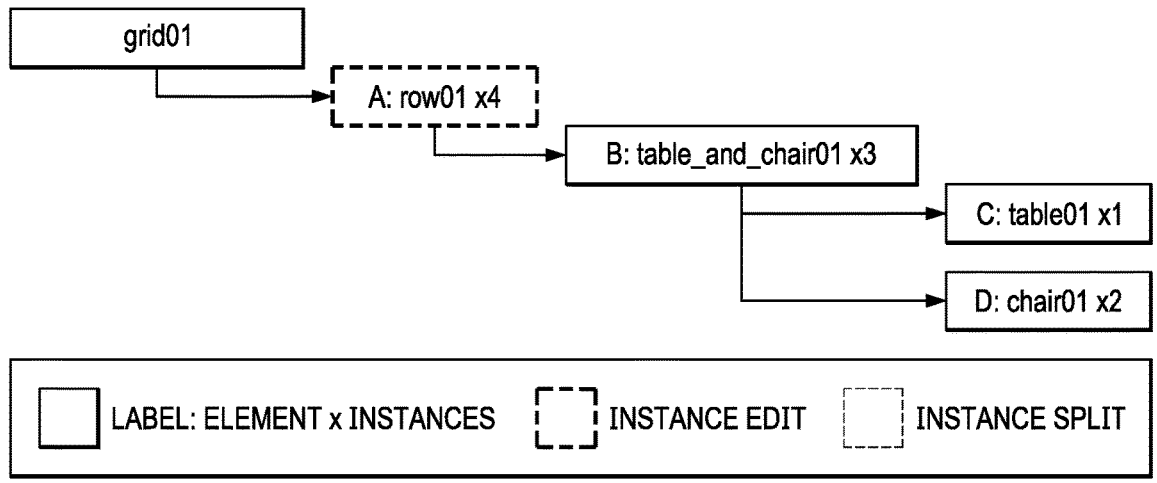
FIG. 14B shows another instancing state of a scene in accordance with an embodiment.
Figure 14C:
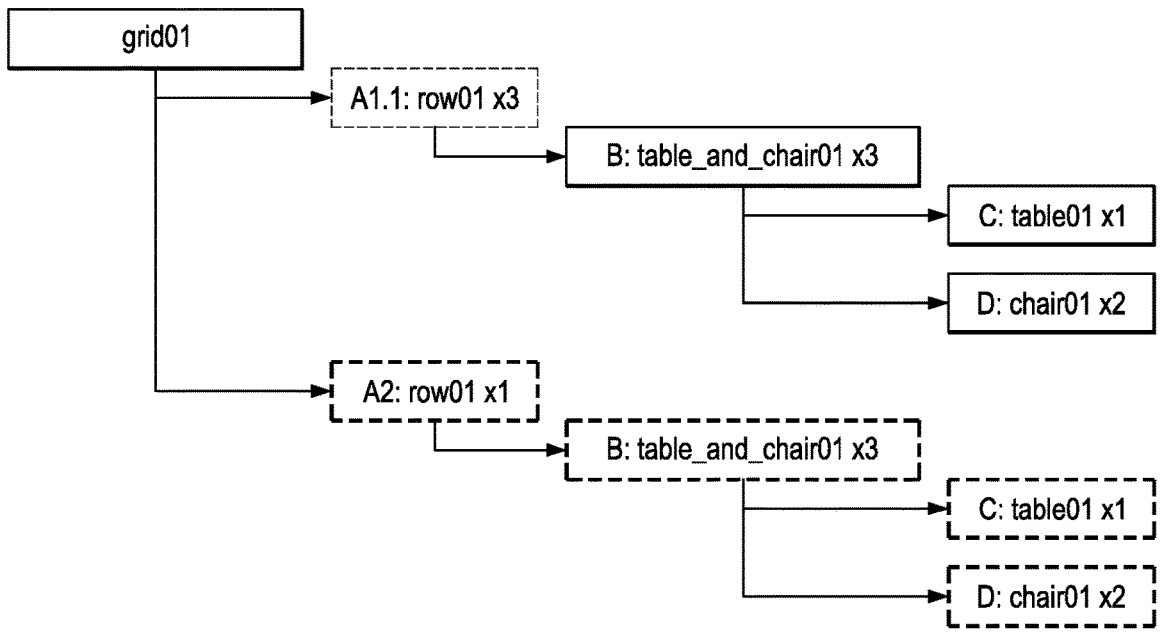
FIG. 14C shows another instancing state of a scene in accordance with an embodiment.

FIG. 14B illustrates a customization applied to a top level instance ("A1:row01×4") that affects all instances. Note, however, that the data specific to nested instances B, C, and D can be seen to be unaffected. In this manner, storage of changes for even global changes can be made efficiently with minimal duplication. FIG. 14C illustrates the state of the instancing structure after the customization depicted in FIG. 8 has been applied to transform the nested instance row 802 ("table_and_chair"). An entire row, "A2:row01×1" is split from "A1.1:row01×3," which otherwise remains unchanged.

Figure 14D:
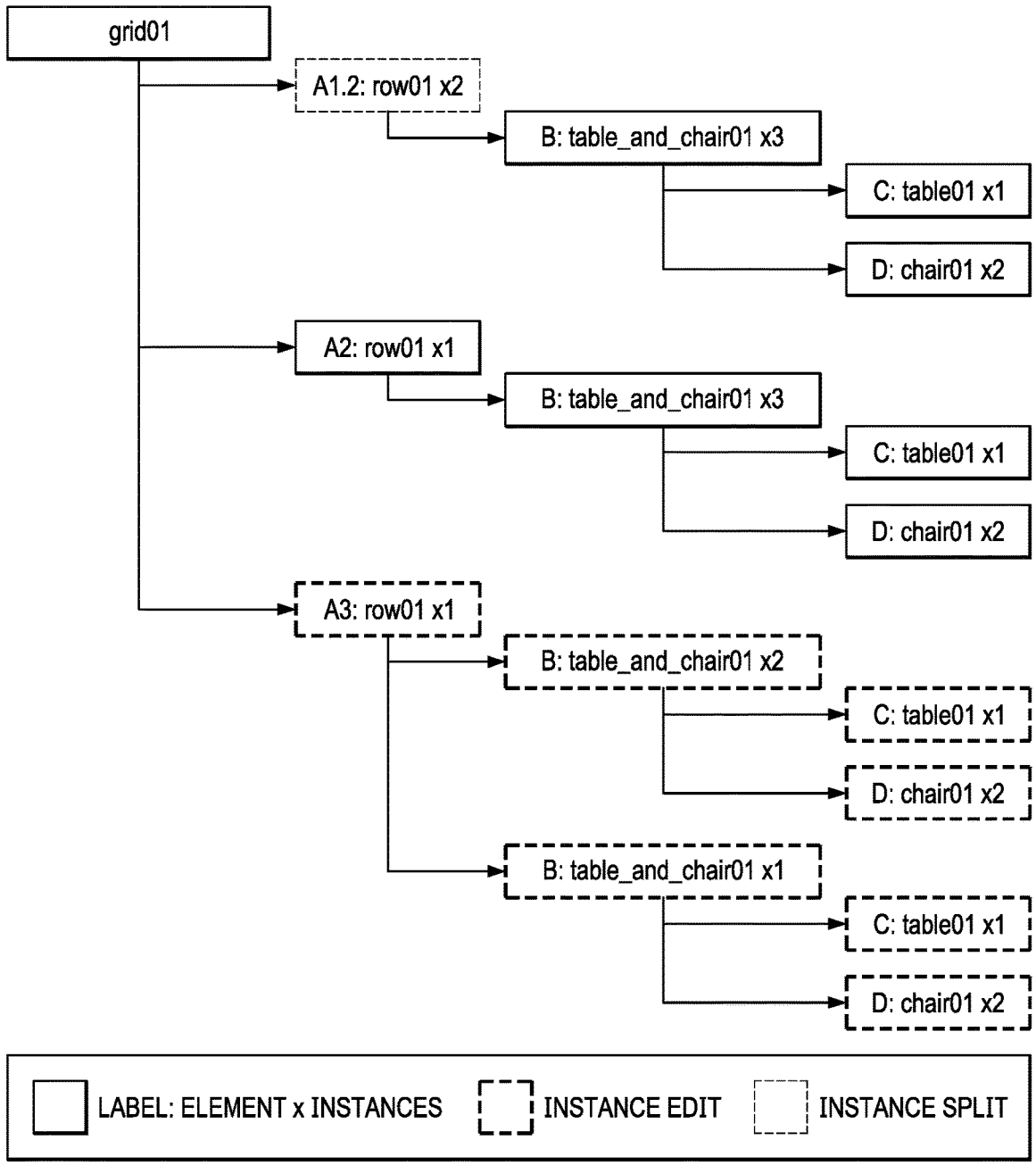
FIG. 14D shows another instancing state of a scene in accordance with an embodiment.
Figure 14E:
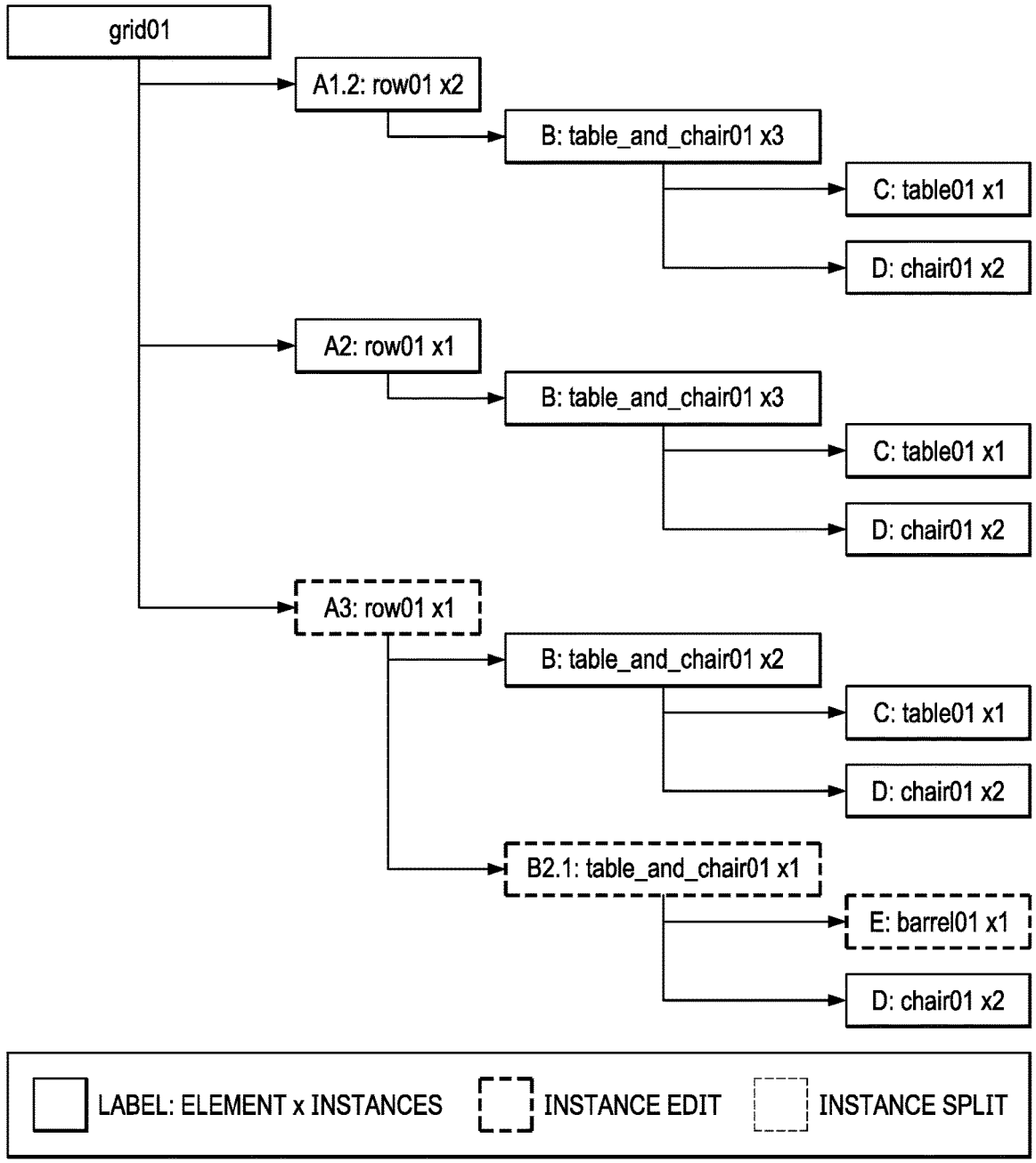
FIG. 14E shows another instancing state of a scene in accordance with an embodiment.

FIG. 14D illustrates how, after the customization depicted in FIG. 10 that rotated a chair object instance, "A2:row01× 1" is also split from row "A1.2:row01×2," along with instances "B1:table_and_chairs01×2" and the customized instance "B2:table_and_chairs01×1"). FIG. 14E illustrates how, after the customization depicted in FIG. 11 that changed the source object from a table to a barrel for one of the nested instances appears in the hierarchy, customizations are stored in the hierarchy of instances. As can be seen, one of the sub-objects of instance "B2.1:table_and_chairs01×1" has been changed from a table object instance to a barrel object instance "E:barrel01×1."

In this manner, techniques of the present disclosure generate a compact structure describing the scene and how it was edited without having to make substantial structural changes to the scene itself, which comports more closely with the expectation of the artist; e.g., that small changes to an instance should have minimal impact on the structure of the scene itself. Furthermore, if an artist determines that individual customizations are no longer needed, the customization may be removed/deleted/inactivated, causing the previously customized attribute to automatically revert to the value inherited from a parent instance or object.

Figure 16:
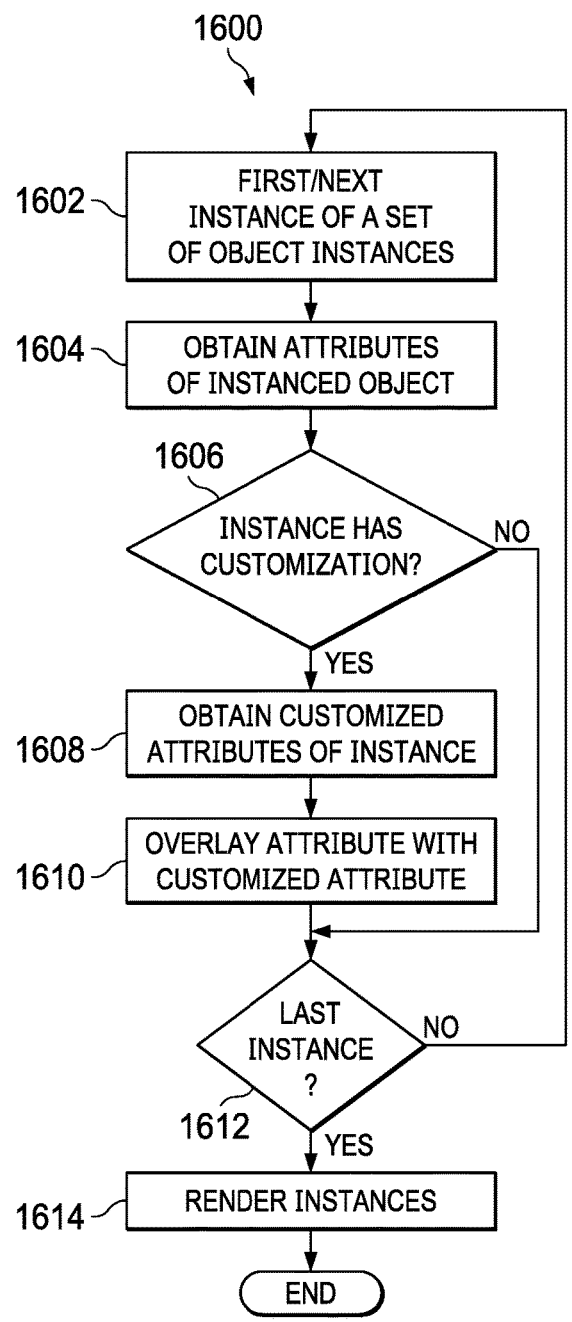
FIG. 16 is a flowchart that shows an example of rendering a set of instances with customizations in accordance with an embodiment.

Additionally, maintaining customizations in this manner allows the renderer to render the customizations efficiently, as further described in conjunction with FIG. 16.

Figure 17:
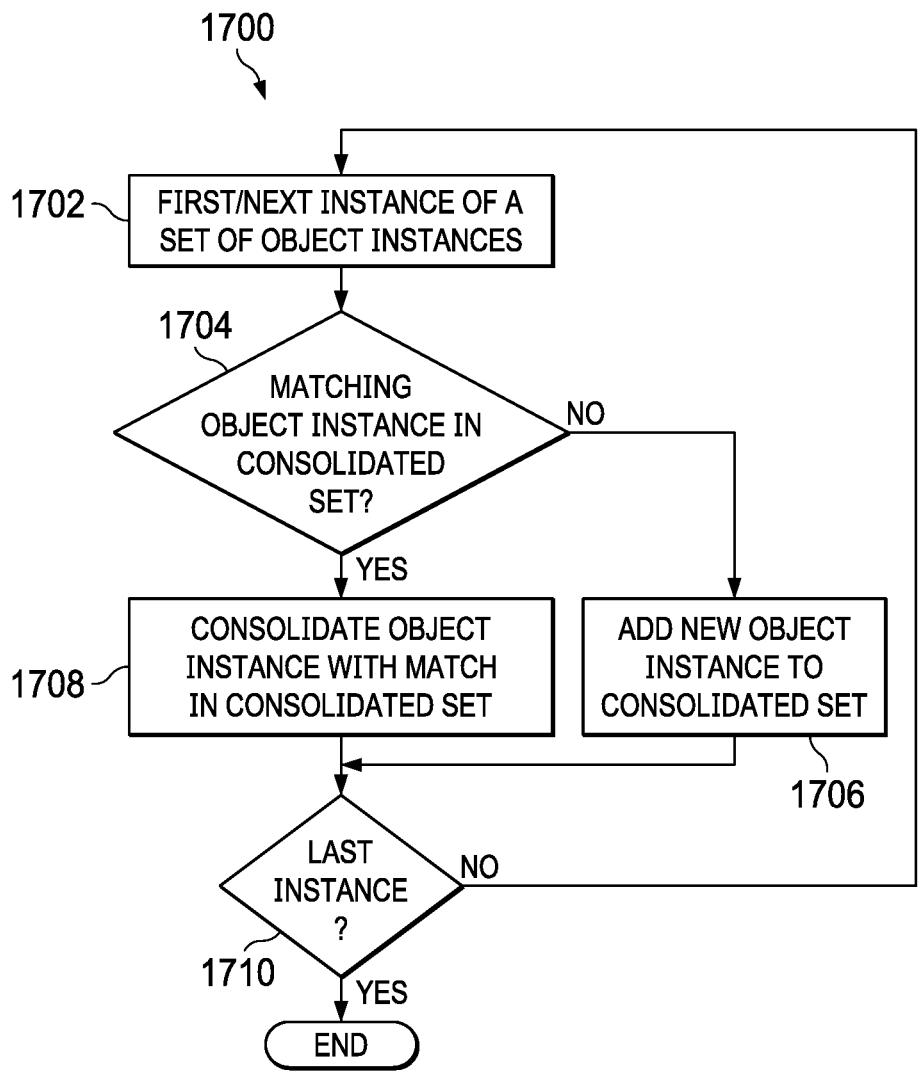
FIG. 17 is a flowchart that shows an example of consolidating customized instances in accordance with an embodiment.

Further, customizations may be easily consolidated, as further described in conjunction with FIG. 17. For example, if, in FIG. 10, the same customization is applied to an instance in a different row, the system of the present disclosure may determine that, although the customizations were performed independently, the customizations produce the same effective row and may be updated to share the same data defining the customization.

Figure 15:
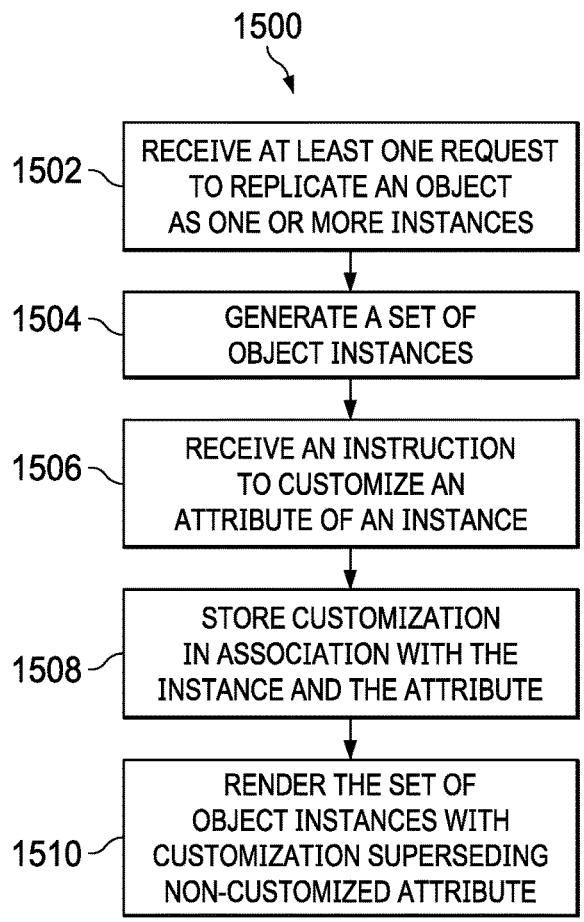
FIG. 15 is a flowchart that shows an example of customizing an attribute of an instanced object in accordance with an embodiment.

FIG. 15 is a flowchart illustrating an example of a process 1500 for customizing an attribute of an instanced object in accordance with various embodiments. Some or all of the process 1500 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media) or carried on a transmission medium.

Figure 19:
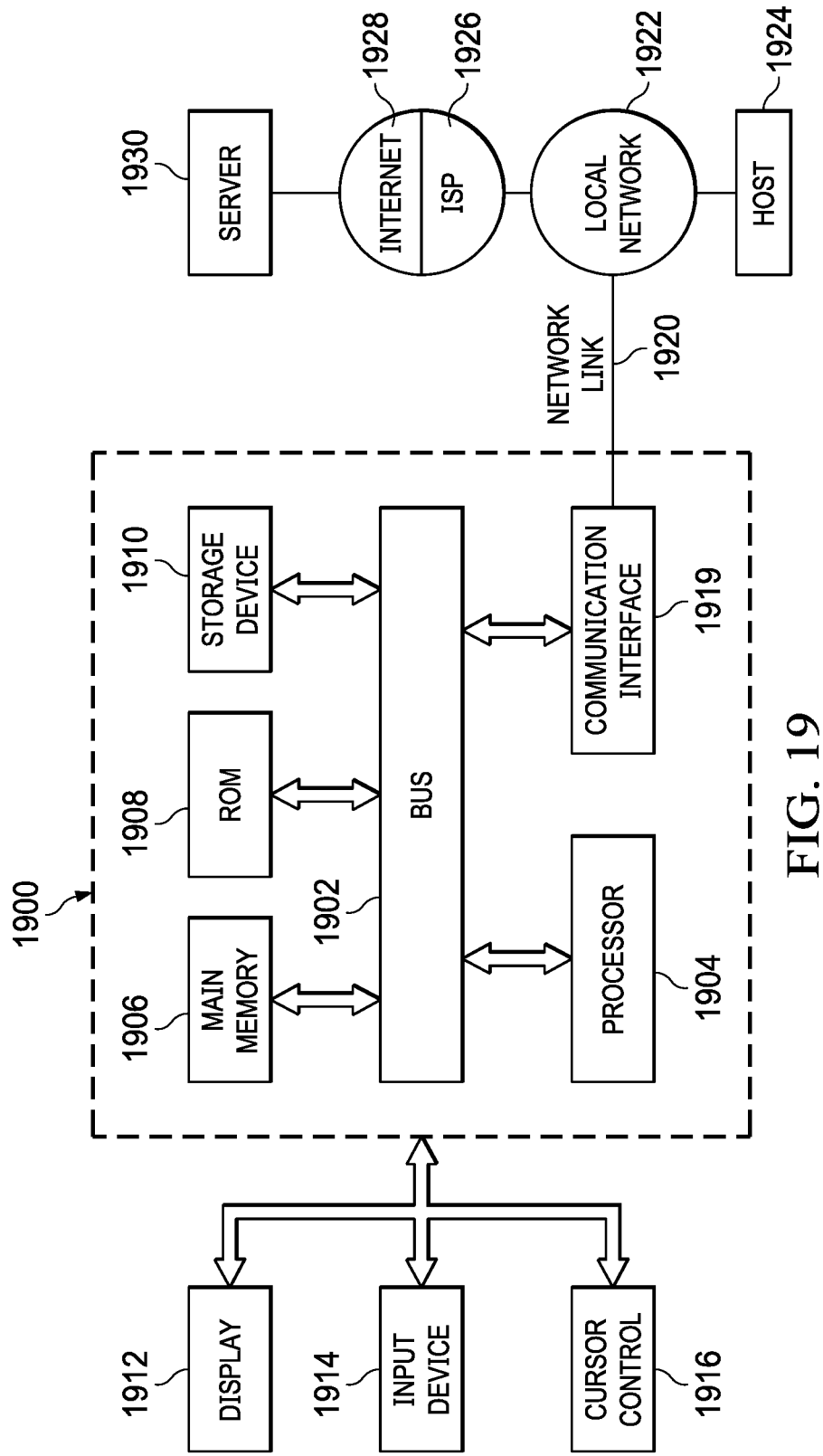
FIG. 19 is a block diagram that illustrates a computer system upon which an embodiment of the invention may be implemented.

For example, some or all of process 1500 may be performed by any suitable system, such as a server in a data center, by various components of the environment described in conjunction with FIG. 19, by multiple computing devices in a distributed system of a computing resource service provider, or by any electronic device such as the computer system 1900. The process 1500 includes a series of operations wherein a request to replicate a digital object may be received, a set of object instances may be generated, an instruction to customize an attribute of one of the object instances may be received, and the customization may be stored in association with the instance and the attribute. Depending on the implementation, these operations may be performed as sequential steps or as concurrent processes or services, or a combination thereof. When the set of object instances is rendered, the customization may overlay the non-customized attribute of the digital object that was customized.

In step 1502, the system performing the process 1500 may receive at least one request (e.g., from an operator of an electronic computing device displaying a user interface such as depicted in FIGS. 4-10) to instantiate a set of object instances in a scene. Each request may indicate a particular object to instantiate, a quantity of the particular object to instantiate, and a position and/or orientation within the scene at which to instantiate each instance of the particular object.

In step 1504, in response to the request, the system performing the process 1500 may generate a set of object instances in fulfilment of the request or requests received in step 1502. For example, FIG. 5 depicts replicating a set of objects in a scene three times and FIG. 6 depicts replicating a row of replicated objects four times.

In step 1506, the system performing the process 1500 may receive a request to customize one of the object instances instantiated in step 1504. The customization to be performed may be to change some characteristic/attribute of the indicated object instance to be different from other of the object instances. In step 1508, in fulfilment of the request to customize, the system may store the customization data in a data structure in association with the instance and the attribute that was customized. In this manner, when the instance is rendered, the system is able to determine which customizations to apply to the instance.

In step 1510, the system performing the process 1500 may render the set of objects in the scene. For each instance that is associated with a customization, the system may obtain the customization data and apply the customization data to take priority over (e.g., supersede) the un-customized attribute data. For example, FIGS. 1-11 illustrate examples of customizations being applied to object instances and the changes in the object hierarchy and sets of data resulting from such customizations. Note that one or more of the operations performed in steps 1502-1510 may be performed in various orders and combinations, including in parallel.

FIG. 16 is a flowchart illustrating an example of a process 1600 for rendering a set of instances with at least one customization in accordance with various embodiments. Some or all of the process 1600 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of process 1600 may be performed by any suitable system, such as a server in a data center, by various components of the environment described in conjunction with FIG. 19, by multiple computing devices in a distributed system of a computing resource service provider, or by any electronic device such as the computer system 1900. The process 1600 includes a series of operations wherein, for each of a set of object instances, object attributes are obtained, a determination is made whether the object instance has a customized attribute, and overlaying the object attribute with the customized attribute. Depending on the implementation, these operations may be performed as a series of steps, or as concurrent processes or services, or a combination thereof.

In step 1602, the system performing the process 1600 retrieves data corresponding to an instance of the set of instances in a scene. The data may include attributes of the instance and of the digital object that has been instanced. For example, the data may indicate the position, orientation, the source object of the instance, and/or whether the instance has been customized.

In step 1604, the system performing the process 1600 may obtain the attributes of the instanced object. As described in the present disclosure, attributes may include characteristics such as size, color, pose, animation, position, orientation, and so on. In step 1606, the system determines whether the object instance has been customized. If not, the system may proceed to step 1612 to determine whether all instances have been processed.

On the other hand, if the object instance has been customized, the system may proceed to step 1608, whereupon the system obtains data corresponding to the customization made to the object instance. For example, the customized instance may have one or more attributes that have been customized (e.g., moved to a different position, different orientation, color change, texture change, scale change, animation change, etc.). In some implementations, the customized attributes may be stored in a separate data set from the attributes corresponding to non-customized attributes.

In step 1610, the system performing the process 1600 may replace, for the attribute that has been customized, the attribute data of the specific instance with the customized attribute data. In this manner, the attribute data common to object instances in the set of object instances is superseded by the customized attribute data. Then, in step 1614, the system performing the process 1600 may determine whether the current instance is the last object instance of the set of object instances. If not, the system may return to step 1602 to perform the operations of steps 1604-1614 for the next object instance in the set. Otherwise, the system may proceed to step 1612, whereupon the system may render the object instances in accordance with the attributes and any customized attributes of the object instances. Thereupon the process 1600 completes. Note that one or more of the operations performed in steps 1602-1614 may be performed in various orders and combinations, including in parallel.

FIG. 17 is a flowchart illustrating an example of a process 1700 for consolidating customizations in accordance with various embodiments. Some or all of the process 1700 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of process 1700 may be performed by any suitable system, such as a server in a data center, by various components of the environment described in conjunction with FIG. 19, by multiple computing devices in a distributed system of a computing resource service provider, or by any electronic device such as the computer system 1900. The process 1700 includes a series of operations wherein, for each customized instance of a set of object instances, determining whether another object instance has the same customization (e.g., whether the two instances can form a consolidated set), and, if so, consolidating object instance with a match in the consolidated set, and if not, adding the object instance to the consolidated set. These operations may be performed as steps, or concurrently by processes or services, or any combination thereof.

In step 1702, the system performing the process 1700 may iterate through object instances of a set of object instances. Thus, for an object instance of a set of object instances, in step 1704, the system may determine whether the object instance matches another object instance in a consolidated set. In some examples, a "consolidated set" refers to a set of instances having the same source object and the same attribute value. For example, in FIG. 1, the first set of object instances 104 may be a consolidated set because the four instances of the house all match.

Otherwise, if the instance has a customization, the system may, in step 1706, iterate through each other instance of the set of object instances. Likewise, the second set of object instances 106A may also be a consolidated set because the 16 instances of the house all match. On the other hand, the first customized object instance 108 may not be in the same consolidated set with the rest of the second set of object instances 106A because, although it may share the same source object as the rest of the second set of object instances 106A, its attributes do not match the attributes of the rest of the second set of object instances. Note that if the object instance does not match any other object instances in the scene, the system may proceed to 1710 (not depicted) to determine whether there are more object instances to evaluate.

If the object instance matches another object instance that is not in a consolidated set, the system may proceed to step 1706. In step 1706, the system consolidates the matching object instances into a new consolidated set. On the other hand, if the object instance matches instances in a consolidated set, the system performing the process 1700 may, in step 1708, the system may consolidate the object instance in the consolidated set. Consolidation may include indicating in a data structure that the object instance and the matching object instances in the consolidated set share common values (e.g., source) and maintain those common values in a single data location; duplicate data may then be discarded, thereby rendering the instancing data size to be more compact, allowing for more efficient use of storage space, and also saving time loading and saving the data. Furthermore, consolidated data may result in faster rendering and other processing time, allowing digital artists to be more productive.

For example, prior to consolidation, instance A may have a corresponding data record for the instance A that has a customization reference field that links instance A to another data record corresponding to a customization X of the instance A. Likewise, instance B may have a corresponding data record for the instance B that has a customization reference field that links instance B to another data record corresponding to customization Y of the instance B. If customizations X and Y match (e.g., except for their unique record identifiers), the record for customization Y may be deleted or inactivated, and the customization reference field for instance B may be updated to link instance B to the customization X. In this manner, instances A and B may both be linked to customization X and the system of the present disclosure may maintain customizations without needing to maintain each customization as a separate data set in the event they match. Note, however, that consolidation need to apply only to customizations, but in some embodiments may be applied to non-customized instances that have not been previously consolidated.

In step 1710, the system performing the process 1700 may determine whether there are any further instances of the set object instances to evaluate. If so, the system may return to step 1702 to evaluate the next instance in the set of object instances. Otherwise, the system may determine that the process 1700 of consolidating customizations is complete.

Note also that one or more of the operations performed in steps 1702-1710 may be performed in various orders and combinations, including in parallel. Furthermore, note that the process 1700 may be performed in conjunction with other processes described in the present disclosure; for example, the process 1700 may be performed at any point during/between the operations of steps 1506-1510 of FIG. 15, or may be performed at some point during/between the operations of steps 1602-1610 shown in FIG. 16. Additionally or alternatively, the process 1700 may be performed after each customization is performed in the scene.

Note that, in the context of describing disclosed embodiments, unless otherwise specified, use of expressions regarding executable instructions (also referred to as code, applications, agents, etc.) performing operations that "instructions" do not ordinarily perform unaided (e.g., transmission of data, calculations, etc.) denotes that the instructions are being executed by a machine, thereby causing the machine to perform the specified operations.

Figure 18:
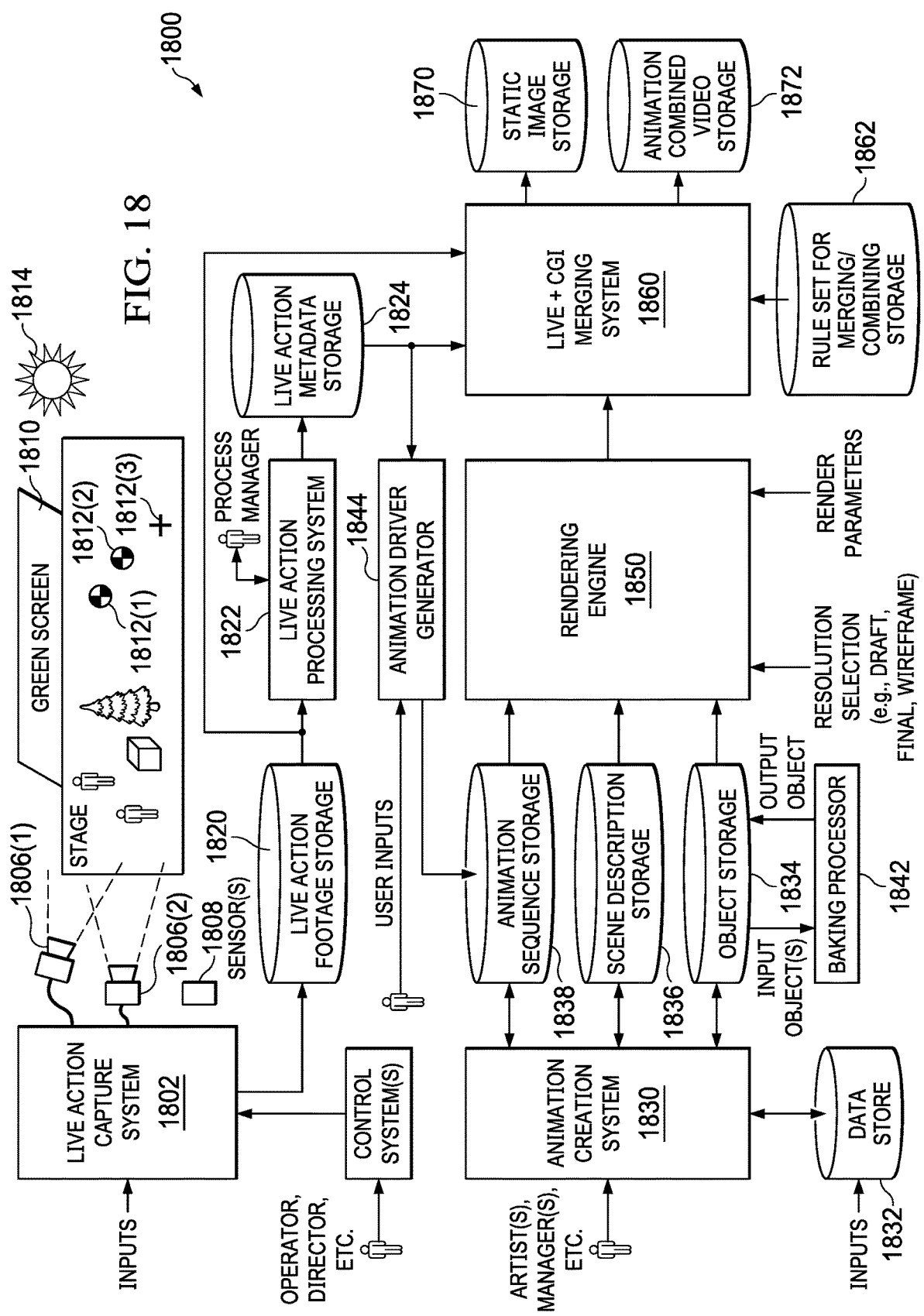
FIG. 18 illustrates an example of visual content generation system as might be used to generate imagery in the form of still images and/or video sequences of images.

FIG. 18 illustrates an example of visual content generation system 1800 as might be used to generate imagery in the form of still images and/or video sequences of images. Visual content generation system 1800 might generate imagery of live action scenes, computer generated scenes, or a combination thereof. In a practical system, users are provided with tools that allow them to specify, at high levels and low levels where necessary, what is to go into that imagery. For example, a user might be an animation artist and might use the visual content generation system 1800 to capture interaction between two human actors performing live on a sound stage and replace one of the human actors with a computer-generated anthropomorphic non-human being that behaves in ways that mimic the replaced human actor's movements and mannerisms, and then add in a third computer-generated character and background scene elements that are computer-generated, all in order to tell a desired story or generate desired imagery.

Still images that are output by visual content generation system 1800 might be represented in computer memory as pixel arrays, such as a two-dimensional array of pixel color values, each associated with a pixel having a position in a two-dimensional image array. Pixel color values might be represented by three or more (or fewer) color values per pixel, such as a red value, a green value, and a blue value in (RGB format). Dimensions of such two-dimensional array of pixel color values might correspond to a preferred and/or standard display scheme, such as 1920-pixel columns by 1280-pixel rows. Images might or might not be stored in compressed format, but either way, they can represent a desired image by being a two-dimensional array of pixel color values. In another variation, images are represented by a pair of stereo images for three-dimensional presentations and in other variations, some or all of an image output might represent three-dimensional imagery instead of just two-dimensional views. In yet other embodiments, pixel values are data structures and a pixel value is associated with a pixel and can be a scalar value, a vector, or another data structure associated with a corresponding pixel. That pixel value might include color values, or not, and might include depth values, alpha values, weight values, object identifiers or other pixel value components.

A stored video sequence might comprise a plurality of images such as the still images described above, but where each image of the plurality of images has a place in a timing sequence and the stored video sequence is arranged so that when each image is displayed in order, at a time indicated by the timing sequence, the display presents what appears to be moving and/or changing imagery. In one representation, each image of the plurality of images is a video frame having a specified frame number that corresponds to an amount of time that would elapse from when a video sequence begins playing until that specified frame is displayed. A frame rate might be used to describe how many frames of the stored video sequence are displayed per unit time. Example video sequences might comprise 24 frames per second (24 FPS), 50 FPS, 60 FPS or other frame rates. In some embodiments, frames are interlaced or otherwise presented for display, but for the purpose of clarity of description, in some examples, it is assumed that a video frame has one specified display time and it should be understood that other variations are possible.

One method of creating a video sequence is to simply use a video camera to record a live action scene, i.e., events that physically occur and can be recorded by a video camera. The events being recorded can be events to be interpreted as viewed (such as seeing two human actors talk to each other) and/or can include events to be interpreted differently due to clever camera operations (such as moving actors about a stage to make one appear larger than the other despite the actors actually being of similar build, or using miniature objects with other miniature objects so as to be interpreted as a scene containing life-sized objects).

Creating video sequences for story-telling or other purposes often calls for scenes that cannot be created with live actors, such as a talking tree, an anthropomorphic object, space battles, and the like. Such video sequences might be generated computationally rather than capturing light from live scenes. In some instances, an entirety of a video sequence might be generated computationally, as in the case of a computer-animated feature film. In some video sequences, it is desirable to have some computer-generated imagery and some live action, perhaps with some careful merging of the two.

While computer-generated imagery might be creatable by manually specifying each color value for each pixel in each frame, this is likely too tedious to be practical. As a result, a creator uses various tools to specify the imagery at a higher level. As an example, an artist might specify the positions in a scene space, such as a three-dimensional coordinate system, of objects, lighting, a camera viewpoint, and a camera view plane. From that, a rendering engine could take all of that as inputs and compute each of the pixel values in each of the frames. In another example, an artist specifies position and movement of an articulated object having some specified texture rather than specifying the color of each pixel representing that articulated object in each frame.

In a specific example, a rendering engine performs ray tracing wherein a pixel color value is determined by computing which objects lie along a ray traced in the scene space from the camera viewpoint through a point or portion of the camera view plane that corresponds to that pixel. For example, a camera view plane might be represented as a rectangle having a position in the scene space that is divided into a grid corresponding to the pixels of the ultimate image to be generated, and if a ray defined by the camera viewpoint in the scene space and a given pixel in that grid first intersects a solid, opaque, blue object, that given pixel is assigned the color blue. Of course, for modern computer-generated imagery, determining pixel colors—and thereby generating imagery—can be more complicated, as there are lighting issues, reflections, interpolations, and other considerations.

As illustrated in FIG. 18, a live action capture system 1802 captures a live scene that plays out on a stage 1804. Live action capture system 1802 is described herein in greater detail, but might include computer processing capabilities, image processing capabilities, one or more processors, program code storage for storing program instructions executable by the one or more processors, as well as user input devices and user output devices, not all of which are shown.

In a specific live action capture system, cameras 1806(1) and 1806(2) capture the scene, while in some systems, there might be other sensor(s) 1808 to capture information from the live scene (e.g., infrared cameras, infrared sensors, motion capture ("mo-cap") detectors, etc.). On stage 1804, there might be human actors, animal actors, inanimate objects, background objects, and possibly an object such as a green screen 1810 that is designed to be captured in a live scene recording in such a way that it is easily overlaid with computer-generated imagery. Stage 1804 might also contain objects that serve as fiducials, such as fiducials 1812(1)-(3), that might be used post-capture to determine where an object was during capture. A live action scene might be illuminated by one or more lights, such as overhead light 1814.

During or following the capture of a live action scene, live action capture system 1802 might output live action footage to live action footage storage 1820. A live action processing system 1822 might process live action footage to generate data about that live action footage and store that data into a live action metadata storage 1824. Live action processing system 1822 might include computer processing capabilities, image processing capabilities, one or more processors, program code storage for storing program instructions executable by the one or more processors, as well as user input devices and user output devices, not all of which are shown. Live action processing system 1822 might process live action footage to determine boundaries of objects in a frame or multiple frames, determine locations of objects in a live action scene, where a camera was relative to some action, distances between moving objects and fiducials, etc. Where elements are sensed or detected, the metadata might include location, color, and intensity of overhead light 1814, as that might be useful in post-processing to match computer-generated lighting on objects that are computer-generated and overlaid on the live action footage. Live action processing system 1822 might operate autonomously, perhaps based on predetermined program instructions, to generate and output the live action metadata upon receiving and inputting the live action footage. The live action footage can be camera-captured data as well as data from other sensors.

An animation creation system 1830 is another part of visual content generation system 1800. Animation creation system 1830 might include computer processing capabilities, image processing capabilities, one or more processors, program code storage for storing program instructions executable by the one or more processors, as well as user input devices and user output devices, not all of which are shown. Animation creation system 1830 might be used by animation artists, managers, and others to specify details, perhaps programmatically and/or interactively, of imagery to be generated. From user input and data from a database or other data source, indicated as data store 1832, animation creation system 1830 might generate and output data representing objects (e.g., a horse, a human, a ball, a teapot, a cloud, a light source, a texture, etc.) to an object storage 1834, generate and output data representing a scene into a scene description storage 1836, and/or generate and output data representing animation sequences to an animation sequence storage 1838.

Scene data might indicate locations of objects and other visual elements, values of their parameters, lighting, camera location, camera view plane and other details that a rendering engine 1850 might use to render CGI imagery. For example, scene data might include the locations of several articulated characters, background objects, lighting, etc. specified in a two-dimensional space, three-dimensional space, or other dimensional space (such as a 2.5-dimensional space, three-quarter dimensions, pseudo-3D spaces, etc.) along with locations of a camera viewpoint and view place from which to render imagery. For example, scene data might indicate that there is to be a red, fuzzy, talking dog in the right half of a video and a stationary tree in the left half of the video, all illuminated by a bright point light source that is above and behind the camera viewpoint. In some cases, the camera viewpoint is not explicit, but can be determined from a viewing frustum. In the case of imagery that is to be rendered to a rectangular view, the frustum would be a truncated pyramid. Other shapes for a rendered view are possible and the camera view plane could be different for different shapes.

Animation creation system 1830 might be interactive, allowing a user to read in animation sequences, scene descriptions, object details, etc. and edit those, possibly returning them to storage to update or replace existing data. As an example, an operator might read in objects from object storage into a baking processor 1842 that would transform those objects into simpler forms and return those to object storage 1834 as new or different objects. For example, an operator might read in an object that has dozens of specified parameters (movable joints, color options, textures, etc.), select some values for those parameters and then save a baked object that is a simplified object with now fixed values for those parameters.

Rather than have to specify each detail of a scene, data from data store 1832 might be used to drive object presentation. For example, if an artist is creating an animation of a spaceship passing over the surface of the Earth, instead of manually drawing or specifying a coastline, the artist might specify that the animation creation system 1830 is to read data from data store 1832 in a file containing coordinates of Earth coastlines and generate background elements of a scene using that coastline data.

Animation sequence data might be in the form of time series of data for control points of an object that has attributes that are controllable. For example, an object might be a humanoid character with limbs and joints that are movable in manners similar to typical human movements. An artist can specify an animation sequence at a high level, such as "the left hand moves from location (X1, Y1, Z1) to (X2, Y2, Z2) over time T1 to T2", at a lower level (e.g., "move the elbow joint 2.5 degrees per frame") or even at a very high level (e.g., "character A should move, consistent with the laws of physics that are given for this scene, from point P1 to point P2 along a specified path").

Animation sequences in an animated scene might be specified by what happens in a live action scene. An animation driver generator 1844 might read in live action metadata, such as data representing movements and positions of body parts of a live actor during a live action scene, and generate corresponding animation parameters to be stored in animation sequence storage 1838 for use in animating a CGI object. This can be useful where a live action scene of a human actor is captured while wearing mo-cap fiducials (e.g., high-contrast markers outside actor clothing, high-visibility paint on actor skin, face, etc.) and the movement of those fiducials is determined by live action processing system 1822. Animation driver generator 1844 might convert that movement data into specifications of how joints of an articulated CGI character are to move over time.

Rendering engine 1850 can read in animation sequences, scene descriptions, and object details, as well as rendering engine control inputs, such as a resolution selection and a set of rendering parameters. Resolution selection might be useful for an operator to control a trade-off between speed of rendering and clarity of detail, as speed might be more important than clarity for a movie maker to test a particular interaction or direction, while clarity might be more important that speed for a movie maker to generate data that will be used for final prints of feature films to be distributed. Rendering engine 1850 might include computer processing capabilities, image processing capabilities, one or more processors, program code storage for storing program instructions executable by the one or more processors, as well as user input devices and user output devices, not all of which are shown.

Visual content generation system 1800 can also include a merging system 1860 that merges live footage with animated content. The live footage might be obtained and input by reading from live action footage storage 1820 to obtain live action footage, by reading from live action metadata storage 1824 to obtain details such as presumed segmentation in captured images segmenting objects in a live action scene from their background (perhaps aided by the fact that green screen 1810 was part of the live action scene), and by obtaining CGI imagery from rendering engine 1850.

Merging system 1860 might also read data from a rulesets for merging/combining storage 1862. A very simple example of a rule in a ruleset might be "obtain a full image comprising a two-dimensional pixel array from live footage, obtain a full image comprising a two-dimensional pixel array from rendering engine 1850 and output an image where each pixel is a corresponding pixel from rendering engine 1850 when the corresponding pixel in the live footage is a specific color of green, otherwise output a pixel value from the corresponding pixel in the live footage".

Merging system 1860 might include computer processing capabilities, image processing capabilities, one or more processors, program code storage for storing program instructions executable by the one or more processors, as well as user input devices and user output devices, not all of which are shown. Merging system 1860 might operate autonomously, following programming instructions, or might have a user interface or programmatic interface over which an operator can control a merging process. In some embodiments, an operator can specify parameter values to use in a merging process and/or might specify specific tweaks to be made to an output of merging system 1860, such as modifying boundaries of segmented objects, inserting blurs to smooth out imperfections, or adding other effects. Based on its inputs, merging system 1860 can output an image to be stored in static image storage 1870 and/or a sequence of images in the form of video to be stored in animated/combined video storage 1872.

Thus, as described, visual content generation system 1800 can be used to generate video that combines live action with computer-generated animation using various components and tools, some of which are described in more detail herein. While visual content generation system 1800 might be useful for such combinations, with suitable settings, it can be used for outputting entirely live action footage or entirely CGI sequences.

According to one embodiment, the techniques described herein are implemented by one or generalized computing systems programmed to perform the techniques pursuant to program instructions in firmware, memory, other storage, or a combination. Special-purpose computing devices may be used, such as desktop computer systems, portable computer systems, handheld devices, networking devices or any other device that incorporates hard-wired and/or program logic to implement the techniques.

For example, FIG. 19 is a block diagram that illustrates a computer system 1900 upon which an embodiment of the invention may be implemented. Computer system 1900 includes a bus 1902 or other communication mechanism for communicating information, and a processor 1904 coupled with bus 1902 for processing information. Processor 1904 may be, for example, a general-purpose microprocessor.

Computer system 1900 also includes a main memory 1906, such as a random-access memory (RAM) or other dynamic storage device, coupled to bus 1902 for storing information and instructions to be executed by processor 1904. Main memory 1906 also may be used for storing temporary variables or other intermediate information during execution of instructions to be executed by processor 1904. Such instructions, when stored in non-transitory storage media accessible to processor 1904, render computer system 1900 into a special-purpose machine that is customized to perform the operations specified in the instructions.

Computer system 1900 further includes a read only memory (ROM) 1908 or other static storage device coupled to bus 1902 for storing static information and instructions for processor 1904. A storage device 1910, such as a magnetic disk or optical disk, is provided and coupled to bus 1902 for storing information and instructions.

Computer system 1900 may be coupled via bus 1902 to a display 1912, such as a computer monitor, for displaying information to a computer user. An input device 1914, including alphanumeric and other keys, is coupled to bus 1902 for communicating information and command selections to processor 1904. Another type of user input device is cursor control 1916, such as a mouse, a trackball, or cursor direction keys for communicating direction information and command selections to processor 1904 and for controlling cursor movement on display 1912. This input device typically has two degrees of freedom in two axes, a first axis (e.g., x) and a second axis (e.g., y), that allows the device to specify positions in a plane.

Computer system 1900 may implement the techniques described herein using customized hard-wired logic, one or more ASICs or FPGAs, firmware and/or program logic which in combination with the computer system causes or programs the computer system 1900 to be a special-purpose machine. According to one embodiment, the techniques herein are performed by computer system 1900 in response to processor 1904 executing one or more sequences of one or more instructions contained in main memory 1906. Such instructions may be read into main memory 1906 from another storage medium, such as storage device 1910. Execution of the sequences of instructions contained in main memory 1906 causes processor 1904 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 1910. Volatile media includes dynamic memory, such as main memory 1906. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1902. Transmission media can also take the form of acoustic or light waves, such as those generated during radio-wave and infra-red data communications.

Various forms of media may be involved in carrying one or more sequences of one or more instructions to processor 1904 for execution. For example, the instructions may initially be carried on a magnetic disk or solid-state drive of a remote computer. The remote computer can load the instructions into its dynamic memory and send the instructions over a network connection. A modem or network interface local to computer system 1900 can receive the data. Bus 1902 carries the data to main memory 1906, from which processor 1904 retrieves and executes the instructions. The instructions received by main memory 1906 may optionally be stored on storage device 1910 either before or after execution by processor 1904.

Computer system 1900 also includes a communication interface 1919 coupled to bus 1902. Communication interface 1918 provides a two-way data communication coupling to a network link 1920 that is connected to a local network 1922. For example, communication interface 1918 may be an integrated services digital network (ISDN) card, cable modem, satellite modem, or a modem to provide a data communication connection to a corresponding type of telephone line. Wireless links may also be implemented. In any such implementation, communication interface 1918 sends and receives electrical, electromagnetic or optical signals that carry digital data streams representing various types of information.

Network link 1920 typically provides data communication through one or more networks to other data devices. For example, network link 1920 may provide a connection through local network 1922 to a host computer 1924 or to data equipment operated by an Internet Service Provider (ISP) 1926. ISP 1926 in turn provides data communication services through the world wide packet data communication network now commonly referred to as the "Internet" 1928. Local network 1922 and Internet 1928 both use electrical, electromagnetic or optical signals that carry digital data streams. The signals through the various networks and the signals on network link 1920 and through communication interface 1918, which carry the digital data to and from computer system 1900, are example forms of transmission media. Storage media and transmission media are examples of computer readable media.

Computer system 1900 can send messages and receive data, including program code, through the network(s), network link 1920 and communication interface 1918. In the Internet example, a server 1930 might transmit a requested code for an application program through Internet 1928, ISP 1926, local network 1922 and communication interface 1918. The received code may be executed by processor 1904 as it is received, and/or stored in storage device 1910, or other non-volatile storage for later execution.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. The code may also be provided carried by a transitory computer readable medium e.g., a transmission medium such as in the form of a signal transmitted over a network.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Further embodiments can be envisioned to one of ordinary skill in the art after reading this disclosure. In other embodiments, combinations or sub-combinations of the above-disclosed invention can be advantageously made. The example arrangements of components are shown for purposes of illustration and it should be understood that combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   (a) receiving a request to replicate a digital object in a scene description of a scene to be represented by one or more computer-generated images;
   (b) generating, to produce a plurality of object instances in the scene description, a first data structure associating the digital object with the plurality of object instances, each instance of the plurality of object instances corresponding to a placement that an instance of the digital object is to appear in the scene, the first data structure including a first set of characteristics of the plurality of object instances that includes the placement;
   (c) receiving a first selection of a first selected object instance of the plurality of object instances;
   (d) receiving a first instruction to customize a first characteristic of the first selected object instance;
   (e) producing a first customized characteristic of the first selected object instance by generating a second data structure associating the first customized characteristic with the first data structure;
   (f) rendering the plurality of object instances such that the first customized characteristic of the second data structure supersedes the characteristic of the digital object in the first data structure;
   (g) receiving a second selection of a second selected object instance of the plurality of object instances;
   (h) receiving a second instruction to customize a second characteristic of the second selected object instance;
   (i) producing a second customized characteristic of the second selected object instance by generating a third data structure associating the second customized characteristic with the first data structure;

(j) rendering the plurality of object instances such that the second customized characteristic of the third data structure supersedes the characteristic of the digital object in the first data structure; and (k) if the first customized characteristic and the second customized characteristic comprise the same customized characteristic, combining the second data structure and the third data structure.

2. A computer readable medium carrying executable instructions that, as a result of execution by one or more processors of a computer system, cause the computer system to carry out the method of claim 1.

3. The method of claim 1, further comprising storing information about each object instance of the plurality of object instances, wherein the information includes at least one of a size, a color, a pose, a position, an orientation, a scale, a skew, a texture, a shading, a direction of motion, a rate of motion, a motion blur, a reflectiveness, a transparency, an animation, a note, a source object, or whether the object instance has been customized.

4. The method of claim 1, further comprising:
receiving a second instruction to modify the first characteristic of the digital object;
modifying the first characteristic of the digital object according to the second instruction; and
modifying the first characteristic of the digital object and of the plurality of object instances without modifying the first customized characteristic of the first selected object instance.

5. A user interface configured to perform the receiving and rendering steps of claim 4.

6. The user interface of claim 5, comprising:
an outliner panel configured to display the name of the object in the scene;
an editor configured to receive selections from a user;
a viewport; and
a layout disposed within the viewport, wherein the layout is configured to display representations of the plurality of object instances.

7. The user interface of claim 6, wherein the layout is further configured to display a rendering of the plurality of object instances.

8. The user interface of claim 7, wherein the outliner panel is configured to display the names of a plurality of objects and object instances.

9. The user interface of claim 8, wherein the names of the plurality of objects and object instances are displayed as a hierarchy.

10. The user interface of claim 9, wherein the hierarchy includes a set of nested object instances.

11. The user interface of claim 8, wherein a customization of an object instance of the plurality of object instances can be deleted at any level of the hierarchy without affecting other instances.

12. The user interface of claim 8, wherein a customization of an object instance of the plurality of object instances can be deleted without affecting other customizations of the object instance.

13. The user interface of claim 8, wherein a customization of a first object instance of the plurality of object instances may be copied to a second object instance of the plurality of object instances.

14. A computer-implemented method, comprising:
(a) receiving a request to replicate a digital object in a scene description of a scene to be represented by one or more computer-generated images;

(b) generating, to produce a plurality of object instances in the scene description, a first data structure associating the digital object with the plurality of object instances, each instance of the plurality of object instances corresponding to a placement that an instance of the digital object is to appear in the scene, the first data structure including a first set of characteristics of the plurality of object instances that includes the placement;

(c) receiving a first selection of a first selected object instance of the plurality of object instances;

(d) receiving a first instruction to customize a first characteristic of the first selected object instance;

(e) producing a first customized characteristic of the first selected object instance by generating a second data structure associating the first customized characteristic with the first data structure;

(f) rendering the plurality of object instances such that the first customized characteristic of the second data structure supersedes the characteristic of the digital object in the first data structure;

(g) receiving a second instruction to modify the first characteristic of the digital object;

(h) modifying the first characteristic of the digital object according to the second instruction;

(i) modifying the first characteristic of the digital object and of the plurality of object instances without modifying the first customized characteristic of the first selected object instance; and (j) configuring a user interface, comprising an outliner panel configured to display the name of the object in the scene, comprising a viewport, and comprising a layout disposed within the viewport, wherein the layout is configured to display representations of the plurality of object instances, wherein the layout is further configured to display a rendering of the plurality of object instances, wherein an outliner panel of the user interface is configured to display the names of a plurality of objects and object instances, wherein the names of the plurality of objects and object instances are displayed as a hierarchy, wherein the hierarchy includes a set of nested object instances, and wherein an object instance of the set of nested object instances can be customized independently from other object instances in the set of nested object instances.

* * * * *